United States Patent
Babu

(10) Patent No.: US 11,165,696 B1
(45) Date of Patent: Nov. 2, 2021

(54) PROVIDING CONVERGENCE PRIORITIZATION FOR BORDER GATEWAY PROTOCOL SERVICES ACROSS PROVIDERS/CUSTOMERS

(71) Applicant: Juniper Networks, Inc., Sunnyvale, CA (US)

(72) Inventor: Suneesh Babu, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 189 days.

(21) Appl. No.: 16/698,885

(22) Filed: Nov. 27, 2019

(51) Int. Cl.
*H04L 12/741* (2013.01)
*H04L 12/66* (2006.01)
*H04L 12/861* (2013.01)
*H04L 12/46* (2006.01)

(52) U.S. Cl.
CPC .............. *H04L 45/54* (2013.01); *H04L 12/66* (2013.01); *H04L 45/74* (2013.01); *H04L 49/90* (2013.01); *H04L 12/4641* (2013.01)

(58) Field of Classification Search
CPC ......... H04L 45/54; H04L 49/90; H04L 45/74; H04L 12/66; H04L 12/4641; H04L 45/58; H04L 12/46
See application file for complete search history.

(56) References Cited

U.S. PATENT DOCUMENTS

| 7,318,108 B2 | 1/2008 | Sreekantiah et al. |
| 7,778,248 B2 | 8/2010 | Scudder et al. |
| 2007/0121524 A1* | 5/2007 | Rangarajan ............. H04L 45/02 370/252 |
| 2016/0094398 A1* | 3/2016 | Choudhury ............. H04L 45/42 370/254 |
| 2017/0289013 A1* | 10/2017 | Haas ..................... H04L 45/021 |

OTHER PUBLICATIONS

"Address Family Numbers", Nov. 4, 2019, https://www.iana.org/assignments/address-family-numbers/address-family-numbers.xhtml, 2 pages.
"Subsequent Address Family Identifiers (SAFI) Parameters", Mar. 5, 2019, https://www.iana.org/assignments/safi-namespace/safi-namespace.xhtml, 2 pages.
Bates et al., "Multiprotocol Extensions for BGP-4", Network Working Group—RFC4760, Jan. 2007, 12 pages.
Rosen et al., "BGP/MPLS IP Virtual Private Networks (VPNs)", Network Working Group—RFC4364, Feb. 2006, 47 pages.

* cited by examiner

*Primary Examiner* — Thai Nguyen
(74) *Attorney, Agent, or Firm* — Harrity & Harrity, LLP

(57) ABSTRACT

A network device may receive convergence prioritization data identifying one or more handling configurations for border gateway protocol update messages. The network device may assign a plurality of table priority values to a respective plurality of border gateway protocol tables associated with a respective plurality of entities based on parameters included in the convergence prioritization data. The network device may assign a plurality of queue priority values to a respective plurality of queues of the plurality of border gateway protocol tables based on the convergence prioritization data. The network device may create one or more border gateway protocol update messages based on the plurality of queue priority values and based on traversing the plurality of border gateway protocol tables using the plurality of table priority values. The network device may provide the one or more border gateway protocol update messages to one or more other network devices.

20 Claims, 16 Drawing Sheets

125

Create one or more BGP update messages based on a second greatest queue priority value (P15) and by traversing the BGP tables using the table priority values

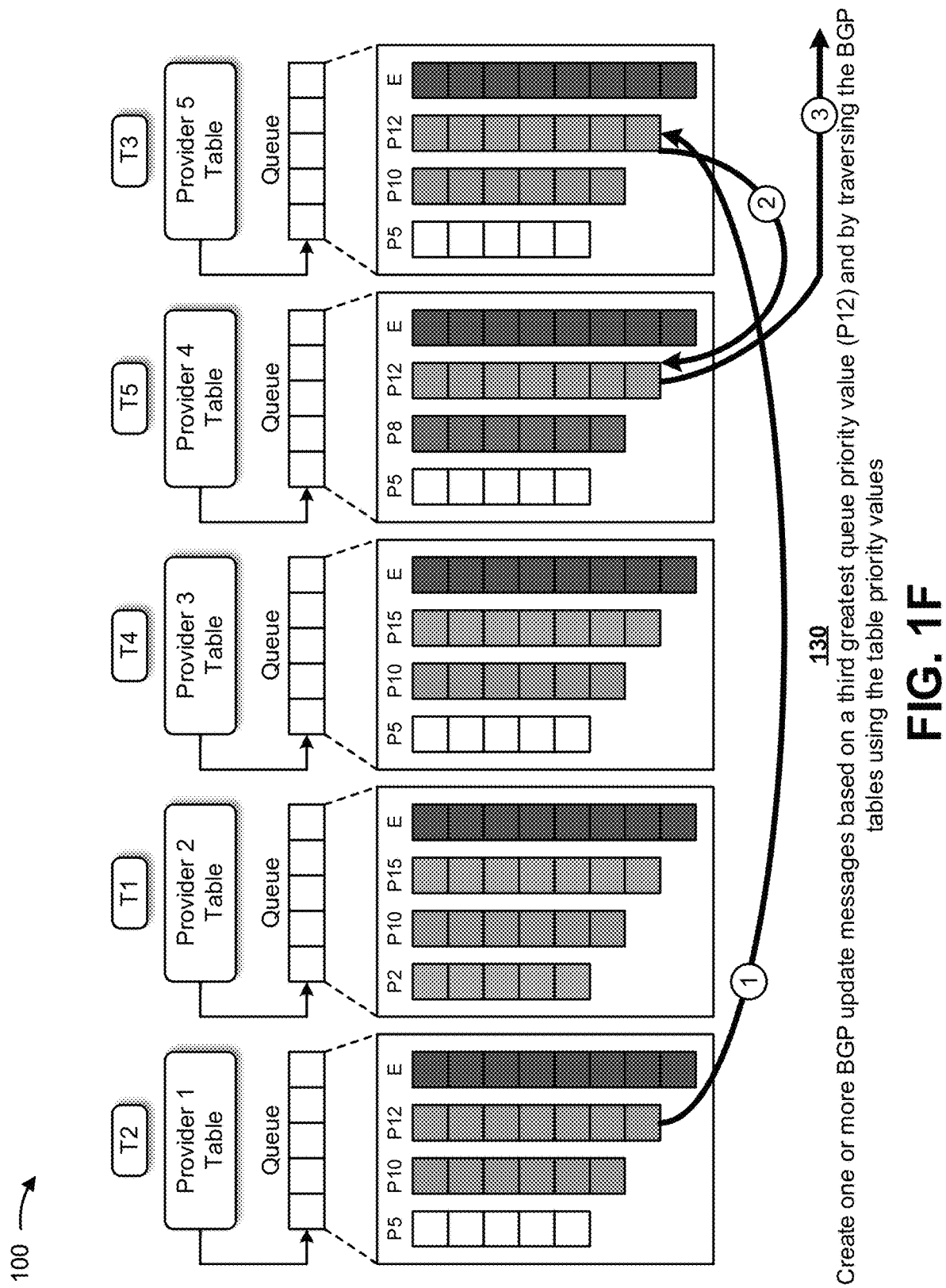

140
Create one or more BGP update messages based on a fifth greatest queue priority value (P8) and by traversing the BGP tables using the table priority values

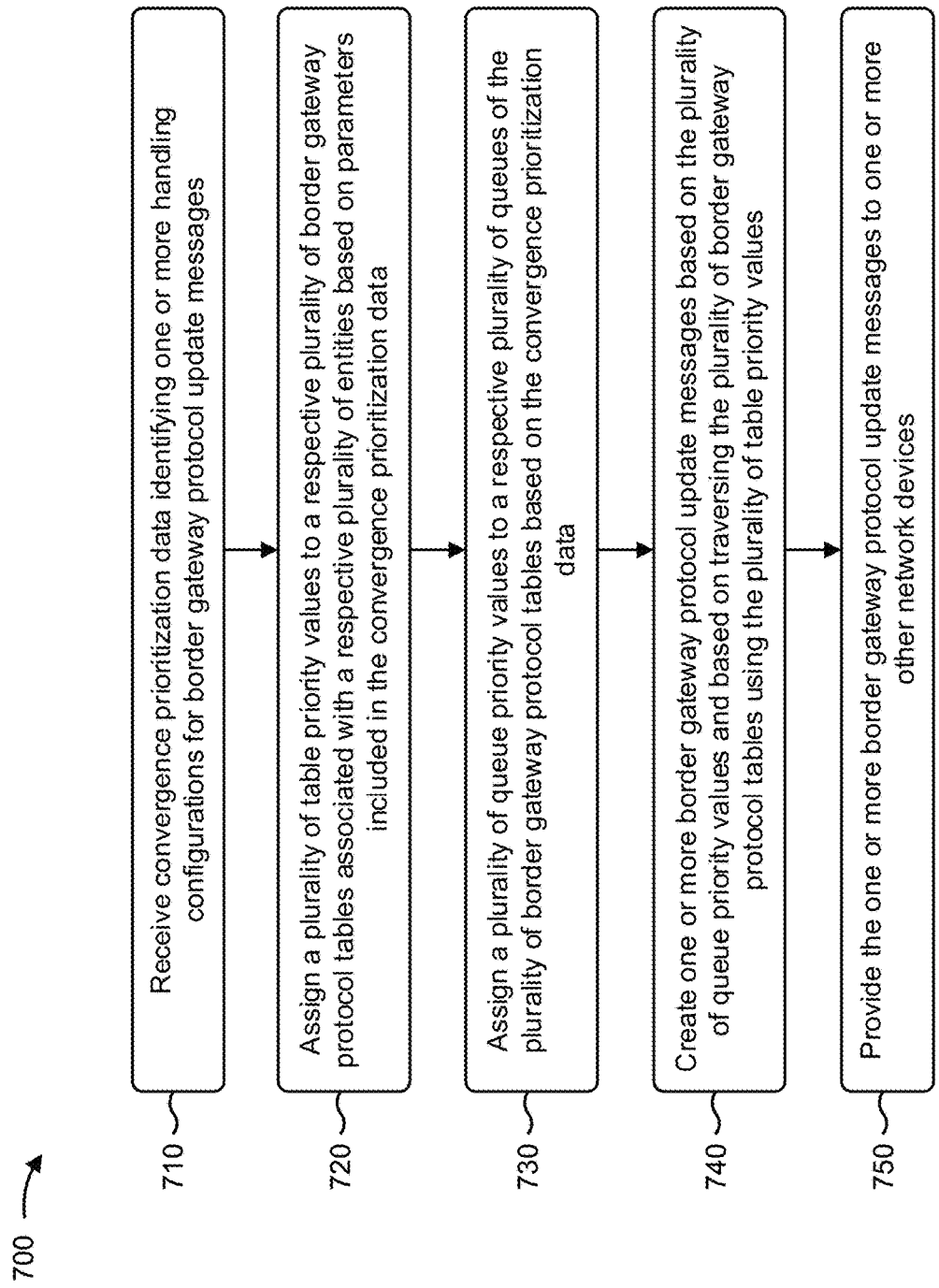

PROVIDING CONVERGENCE PRIORITIZATION FOR BORDER GATEWAY PROTOCOL SERVICES ACROSS PROVIDERS/CUSTOMERS

BACKGROUND

Border gateway protocol (BGP) is a widely deployed exterior gateway routing protocol. BGP handles network layer reachability information (NLRI) and many types of virtual private network (VPN) reachability information. However, BGP does not specify how information is ordered in BGP update messages. A BGP update message is used to send routing updates to peer network devices. When a BGP session is initialized, BGP update messages are sent until a complete BGP route table has been exchanged. Every time a BGP update message is received, the BGP route table is updated and a version number of the BGP route table is incremented by one.

In large-scale networks, BGP may take a significant amount of time to exchange routing information among network devices. This is especially true during BGP startup, route refresh operations, and during a network restart. In order to handle the large amount of information that needs to be processed, BGP route processing is accomplished with the use of queues. Outbound route information is stored in the queues for processing. BGP route prioritization may be utilized to deterministically prioritize BGP update messages. BGP route prioritization is a process that operates on the queues and that helps to order information that is being sent to BGP peer network devices.

SUMMARY

According to some implementations, a method may include receiving convergence prioritization data identifying one or more handling configurations for border gateway protocol update messages, and assigning a plurality of table priority values to a respective plurality of border gateway protocol tables associated with a respective plurality of entities based on parameters included in the convergence prioritization data. The method may include assigning a plurality of queue priority values to a respective plurality of queues of the plurality of border gateway protocol tables based on the convergence prioritization data, and creating one or more border gateway protocol update messages based on the plurality of queue priority values and based on traversing the plurality of border gateway protocol tables using the plurality of table priority values.

According to some implementations, a network device may include one or more memories, and one or more processors to receive convergence prioritization data identifying one or more handling configurations for border gateway protocol update messages, and assign a plurality of table priority values to a respective plurality of border gateway protocol tables associated with a respective plurality of entities based on parameters included in the convergence prioritization data. The one or more processors may assign a plurality of queue priority values to a respective plurality of queues of the plurality of border gateway protocol tables based on the convergence prioritization data, and may traverse each of the plurality of queues of the plurality of border gateway protocol tables, based on the plurality of table priority values and the plurality of queue priority values, to identify information in the plurality of queues. The one or more processors may generate one or more border gateway protocol update messages based on the information in the plurality of queues, and may provide the one or more border gateway protocol update messages to one or more other network devices.

According to some implementations, a non-transitory computer-readable medium may store one or more instructions that, when executed by one or more processors of a network device, may cause the one or more processors to receive convergence prioritization data identifying one or more handling configurations for border gateway protocol update messages, and assign a plurality of table priority values to a respective plurality of border gateway protocol tables associated with a respective plurality of entities based on parameters included in the convergence prioritization data. The one or more instructions may cause the one or more processors to assign a plurality of queue priority values to a respective plurality of queues of the plurality of border gateway protocol tables based on the convergence prioritization data, and create one or more border gateway protocol update messages based on the plurality of queue priority values and based on traversing the plurality of border gateway protocol tables using the plurality of table priority values. The one or more instructions may cause the one or more processors to provide the one or more border gateway protocol update messages to one or more other network devices.

BRIEF DESCRIPTION OF THE DRAWINGS

FIGS. 1A-1J are diagrams of one or more example implementations described herein.

FIGS. 5-7 are flow charts of example processes for providing convergence prioritization for border gateway protocol services across providers/customers.

DETAILED DESCRIPTION

Figure 1A:
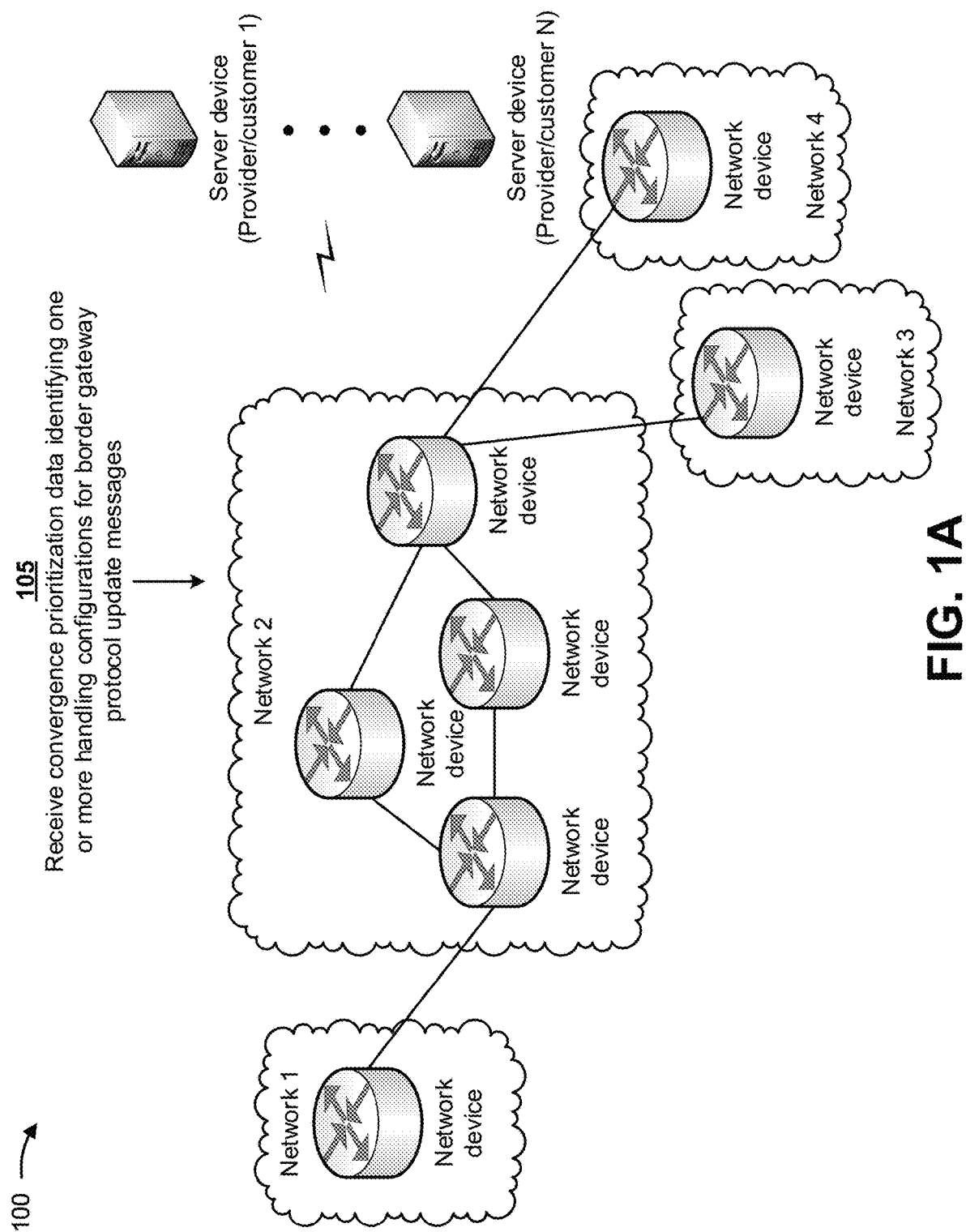

The following detailed description of example implementations refers to the accompanying drawings. The same reference numbers in different drawings may identify the same or similar elements.

In a default configuration, when no queue priority configuration or policy that overrides priority exists, a routing protocol process enqueues BGP routes into the queues per routing table. A routing table may include information that corresponds to a specific address family (e.g., inet.0) and to routing instance tables (e.g., vrf.inet.0). While processing queues, a network device clears the queues for a current routing table before moving on to a next routing table that includes a non-empty queue.

Because of the default behavior, any specific routing table that continues to increase in size while being processed can lead to starvation (e.g., a lack of route update processing) in other routing tables. This may result in NLRI that is more important than other NLRI being queued behind a long list of other route processing in a nondeterministic manner.

Convergence prioritization relates to handling routes in a network device. BGP provides different families of services, such as VPN version 4 (VPNv4), VPN version 6 (VPNv6), layer 2 VPN (L2VPN), Ethernet VPN (EVPN), multicast VPN (MVPN), and/or the like. These services are differentiated by address family identifier (AFI) values and sub-address family identifier (SAFI) values. In service provider networks, these families are stored in separate routing tables, such as bgp.l3vpn.0, bgp.l2vpn.0, bgp.evpn.0, and/or the like. Provider and/or customer (provider/customer) routes in the routing tables are identified by unique route distinguisher (RD) values. Currently, convergence prioritization is not provided across different providers/customers having these services. Thus, network devices waste computing resources (e.g., processing resources, memory resources, communication resources, and/or the like), networking resources, and/or the like associated with incorrectly processing queues without priority across different providers/customers, delaying traffic for providers/customers that pay more for services than other providers/customers, and/or the like.

Some implementations described herein provide a network device that provides convergence prioritization for border gateway protocol services across providers/customers. For example, the network device may receive convergence prioritization data identifying one or more handling configurations for border gateway protocol update messages, and may assign a plurality of table priority values to a respective plurality of border gateway protocol tables associated with a respective plurality of entities based on parameters included in the convergence prioritization data. The network device may assign a plurality of queue priority values to a respective plurality of queues of the plurality of border gateway protocol tables based on the convergence prioritization data. The network device may create one or more border gateway protocol update messages based on the plurality of queue priority values and based on traversing the plurality of border gateway protocol tables using the plurality of table priority values. The network device may provide the one or more border gateway protocol update messages to one or more other network devices.

In this way, convergence prioritization may be provided for border gateway protocol services across providers/customers. This, in turn, conserves computing resources (e.g., processing resources, memory resources, communication resources, and/or the like), networking resources, and/or the like that would otherwise be wasted in incorrectly processing queues without priority across different providers/customers, delaying traffic for providers/customers that pay more for services than other providers/customers, and/or the like. Furthermore, providing convergence prioritization for border gateway protocol services across providers/customers may enable network devices to process information associated with providers/customers based on priorities allotted to the providers/customers (e.g., one provider/customer may pay the most to have the provider/customer's traffic handled first over other providers/customers).

FIGS. 1A-1J are diagrams of one or more example implementations 100 described herein. As shown in FIG. 1A, a multiple server devices may be associated with multiple network devices of multiple networks (e.g., an autonomous system). Although only two server devices, seven network devices, and four networks, are depicted in FIG. 1A, implementations described herein may utilize more server devices, network devices, and/or networks. As further shown in FIG. 1A, each server device may be associated with a provider/customer (e.g., provider/customer 1 through provider/customer N, where N>1), such as a provider/customer of one or more services, one or more applications, and/or the like. For example, each server device may provide traffic to and/or receive traffic from other server devices, via the network devices of the network. In some implementations, the providers/customers may be charged different prices for delivering and/or receiving traffic based on priorities assigned to the traffic. For example, a first provider/customer may pay a greatest price to have the traffic delivered and/or received prior to pending traffic associated with the remaining providers/customers.

As further shown in FIG. 1A, each of the networks may include one or more network devices. For example, a first network (e.g., Network 1) may include one network device, a second network (e.g., Network 2) may include four network devices, a third network (e.g., Network 3) may include one network device, a fourth network (e.g., Network 4) may include one network device, and/or the like. In some implementations, the networks may interconnect via one or more of the network devices included within the network.

As further shown in FIG. 1A, and by reference number 105, the network devices may receive convergence prioritization data identifying one or more handling configurations for border gateway protocol (BGP) update messages. BGP enables different families of services, such as VPNv4, VPNv6, L2VPN, EVPN, MVPN, and/or the like to be provided by the plurality of providers/customers. The services may be differentiated by AFI values and SAFI values allocated to the services. In the networks (e.g., service provider networks), data identifying the families of services provided by each of the plurality of providers/customers may be stored in separate BGP routing tables (e.g., hereinafter referred to as BGP tables), such as Layer 3 VPN table (e.g., l3vpn.0), a Layer 2 VPN table (e.g., l2vpn.0), an EVPN table (e.g., evpn.0), an Internet protocol version 4 (IPv4) table (e.g., Inet.0), an IP version 6 (IPv6) table (e.g., Inet.3), and/or the like. Routes associated with each of the plurality of providers/customers may be stored in one of the BGP tables and the plurality of providers/customers may be identified by unique route distinguisher (RD) values. Each BGP table may include a queue that stores data identifying a quantity of the routes associated with each of the plurality of providers/customers. Each of the queues may be divided into additional logical queues to which priority values may be assigned, as described below.

In some implementations, the one or more handling configurations may include parameters associated with assigning table priority values to the separate BGP tables and associated with assigning queue priority values to the logical queues included each of the BGP tables. For example, the one or more handling configurations may include an AFI parameter, a SAFI parameter, an RD parameter, and/or the like. In some implementations, the one or more handling configurations may include information associated with assigning a unique table priority value, based on a uniquely identified combination of an AFI value, a SAFI value, and an RD value, to each of the BGP tables to identify the customer services. In this way, the one or more handling configurations enable assigning different table priority values across different providers/customers so that a provider/customer that pays more may receive higher priority handling of traffic associated with the provider/customer. Each provider/customer may select which of the parameters (e.g., the AFI value, the SAFI value, and the RD value) to utilize for assigning the unique table priority value.

In some implementations, the one or more handling configurations may include a parameter identifying assignment of queue priority values to each of the logical queues associated with each of the BGP tables. The logical queue priority may be based on a pure policy applied on a set of matching routes or a set of matching route attributes (e.g., community, tags, origin, and/or the like), on route action types (e.g., initial advertisement, withdraw routes, updated routes, and/or the like), and/or the like. The queue priority values assigned to the each of the logical queues may enable a provider/customer to implement prioritization of routes using a provider/customer policy. For example, a quantity of queue priority values may be assigned to the logical queues in descending order of queue priority values, where an expedited (E) queue priority value may be top priority, followed by a queue priority value (P16) that is less than the expedited queue priority value, followed by a queue priority value (P15) that is less than queue priority value P16, and/or the like, until a lowest queue priority value (P1) is reached. When routes are identified in the logical queues, the queue priority values may enable selection of expedited priority routes first for each of the BGP tables, followed by P16 priority routes, P15 priority routes, and/or the like. Each of the logical priority queues are assigned with tokens to avoid starvation of low priority queues.

BGP convergence prioritization enables the routes to be prioritized to obtain improved convergence. In the event of convergence, a BGP update message may be created from routes included in the logical queues of the BGP tables based on the table priority values and the queue priority values assigned in accordance with the one or more handling configurations.

Figure 1B:
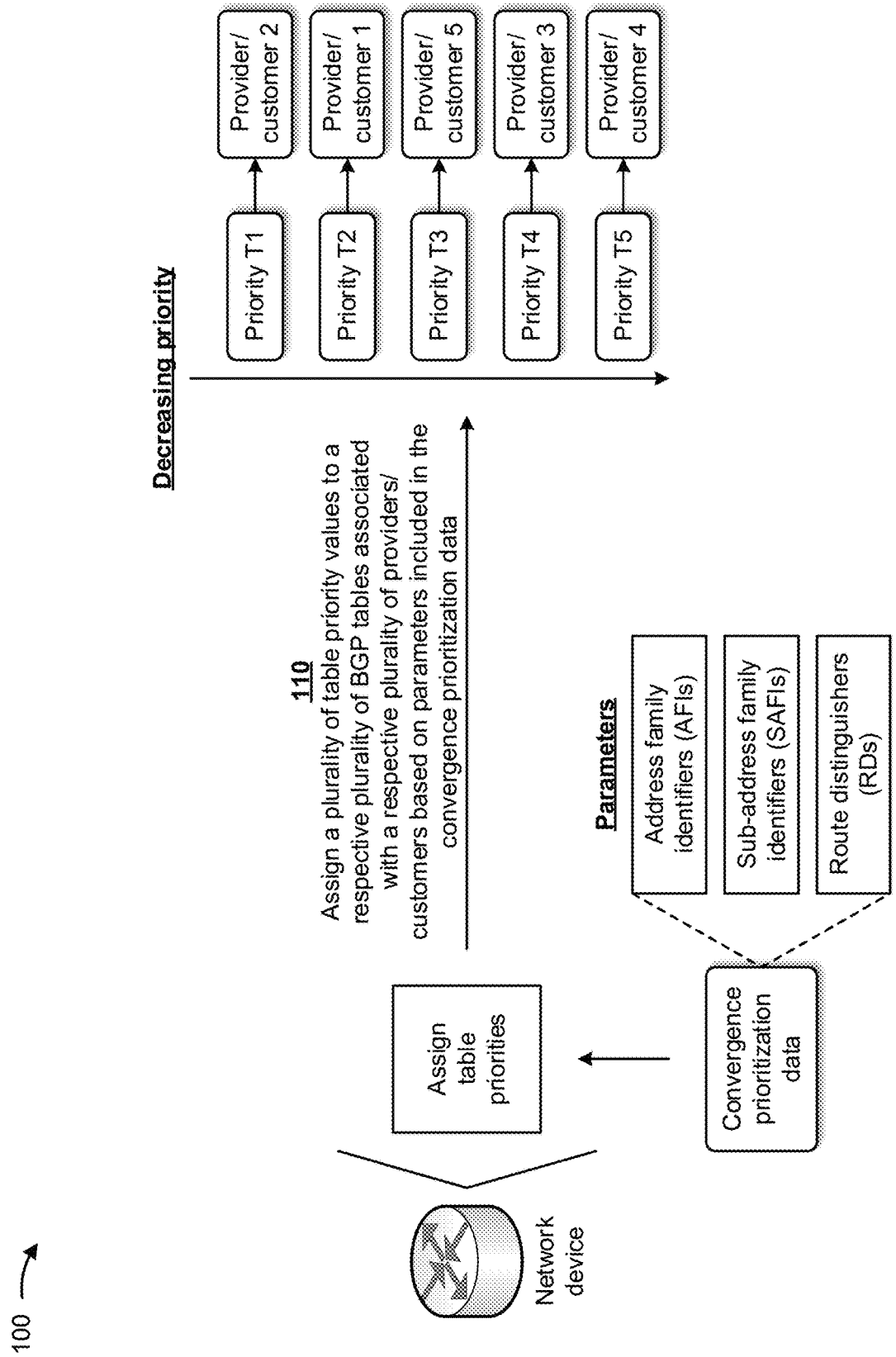

As shown in FIG. 1B, and by reference number 110, the network device may assign a plurality of table priority values to a respective plurality of BGP tables associated with a respective plurality of the providers based on the parameters included in the convergence prioritization data. In some implementations, the parameters may include the AFI parameter, the SAFI parameter, the RD parameter, and/or the like. The network device may utilize these parameters to assign a unique table priority value, based on a uniquely identified combination of an AFI value, a SAFI value, and an RD value, to each of the BGP tables.

For example, as further shown in FIG. 1B, the network device may assign a first table priority value (T1) to a BGP table associated with a second provider/customer of the plurality of providers/customers, a second table priority value (T2) to a BGP table associated with a first provider/customer of the plurality of providers/customers, a third table priority value (T3) to a BGP table associated with a fifth provider/customer of the plurality of providers/customers, a fourth table priority value (T4) to a BGP table associated with a third provider/customer of the plurality of providers/customers, a fifth table priority value (T5) to a BGP table associated with a fourth provider/customer of the plurality of providers/customers, and/or the like. In some implementations, the table priority values may be assigned in descending order, where the first table priority value (T1) is greater than the second table priority value (T2), the second table priority value (T2) is greater than the third table priority value (T3), and/or the like (e.g., T1>T2>T3>T4>T5).

Figure 1C:
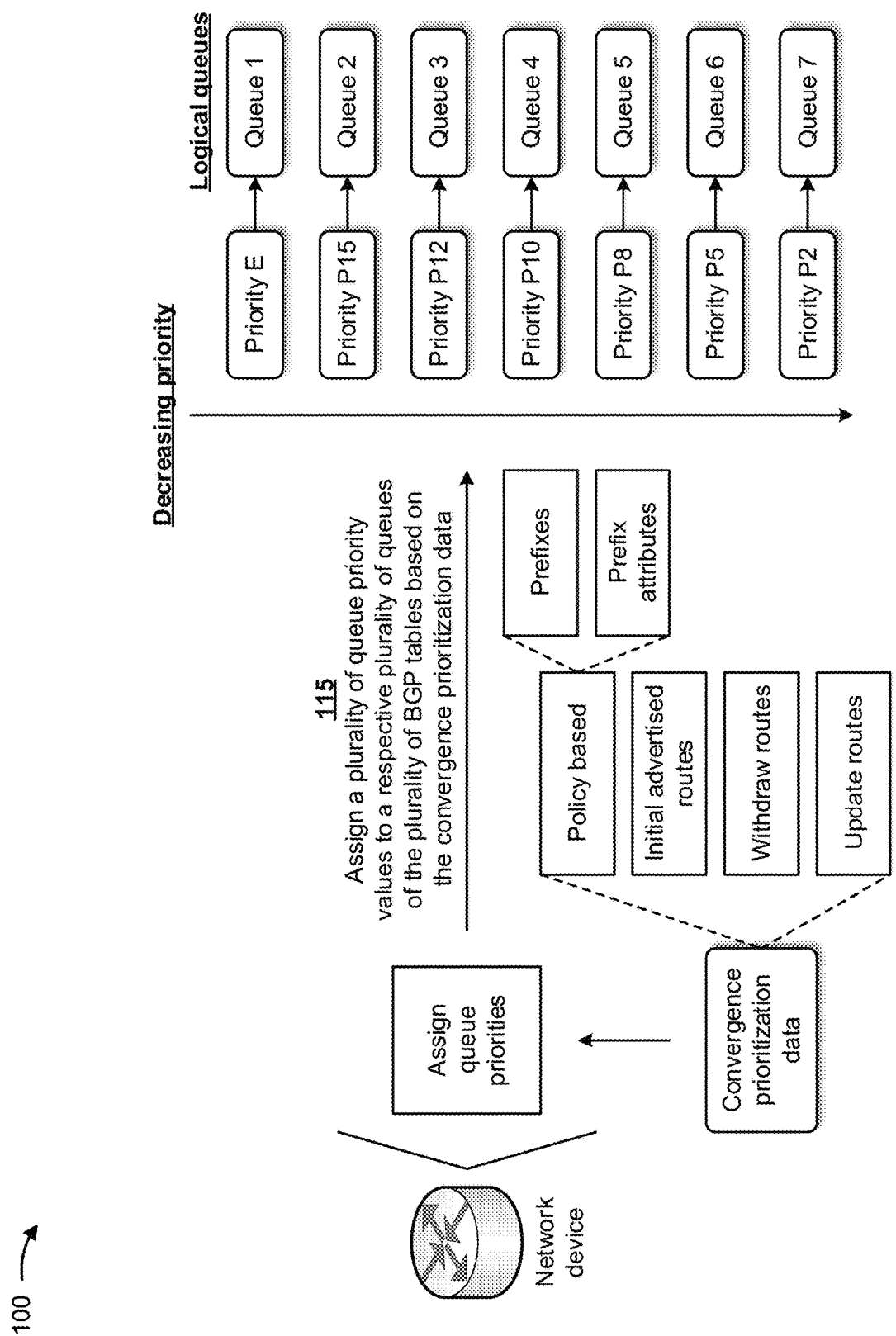

As shown in FIG. 1C, and by reference number 115, the network device may assign a plurality of queue priority values to a respective plurality of queues (e.g., stored in the logical queues) of the plurality of BGP tables based on the convergence prioritization data. In some implementations, the convergence prioritization data may include a parameter identifying assignment of queue priority values to each of the routes (e.g., stored in the logical queues) associated with each of the BGP tables; a parameter identifying policy-based queue priorities (e.g., based on prefixes and/or prefix attributes); a parameter identifying queue priorities based on initially advertised routes; a parameter identifying queue priorities based on withdrawal of routes; a parameter identifying queue priorities based on updates to routes; and/or the like.

For example, as further shown in FIG. 1C, the network device may assign an expedited queue priority value (E) to a first queue of the plurality of queues, a fifteenth queue priority value (P15) to a second queue of the plurality of queues, a twelfth queue priority value (P12) to a third queue of the plurality of queues, a tenth queue priority value (P10) to a fourth queue of the plurality of queues, an eighth queue priority value (P8) to a fifth queue of the plurality of queues, a fifth queue priority value (P5) to a seventh queue of the plurality of queues, a second queue priority value (P2) to a seventh queue of the plurality of queues, and/or the like. In some implementations, the queue priority values may be assigned in descending order, where the expedited queue priority value (E) is greater than the fifteenth queue priority value (P15), the fifteenth queue priority value (P15) is greater than the twelfth queue priority value (P12), and/or the like (e.g., E>P15>P12>P10>P8>P5>P2). In some implementations, assignment of queue priority values to the routes stored in the logical queues may be based on a route action type (e.g., an initial advertisement action, a withdraw routes action, an update routes action, and/or the like), policy rules on routes or route attributes, and/or the like.

Figure 1D:
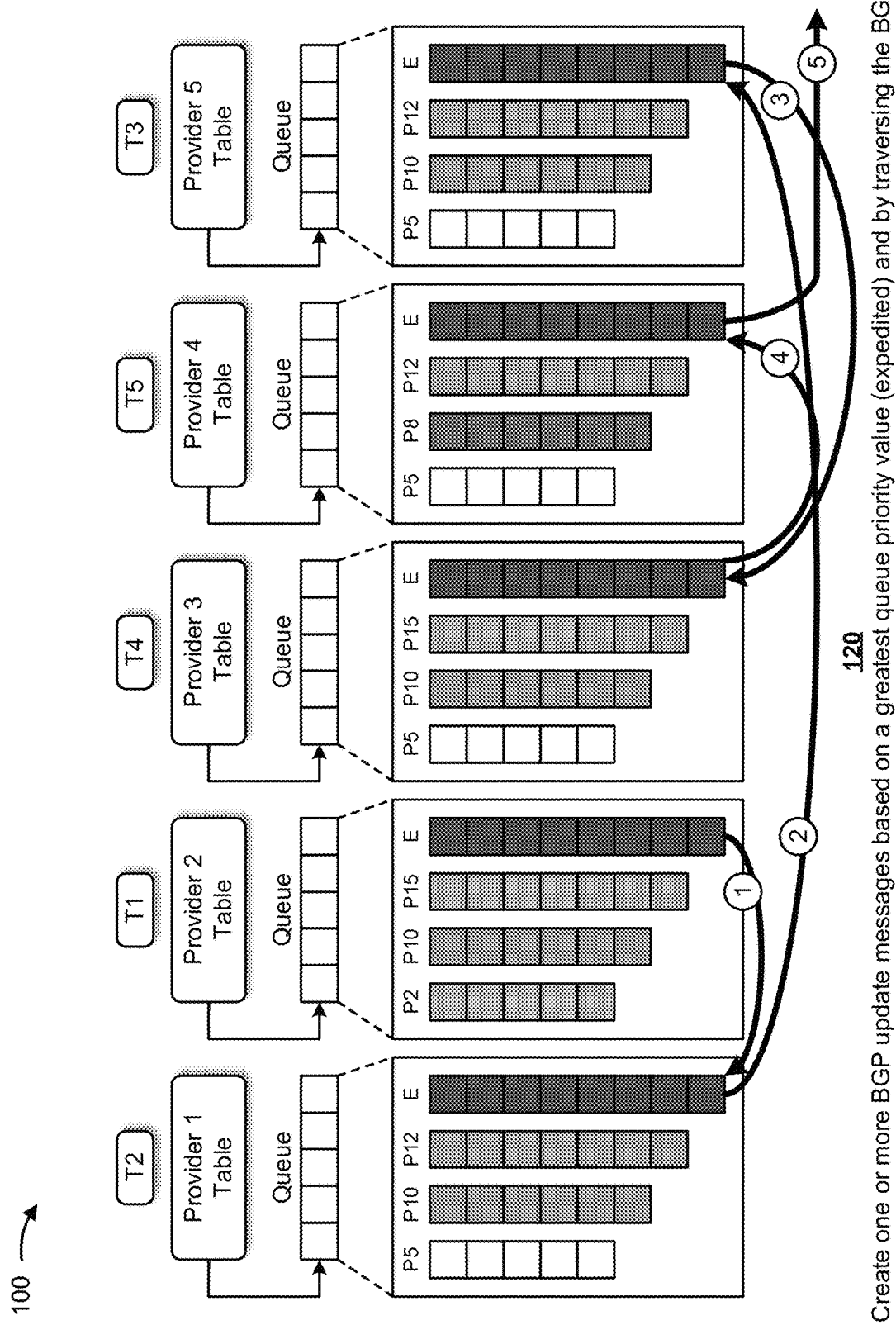

As shown in FIG. 1D, based on assigning the table priority values, the network device may store a BGP table for the first provider/customer (e.g., Provider 1 Table) and the second table priority value (T2) assigned to the BGP table for the first provider; a BGP table for the second provider/customer (e.g., Provider 2 Table) and the first table priority value (T1) assigned to the BGP table for the second provider; a BGP table for the third provider/customer (e.g., Provider 3 Table) and the fourth table priority value (T4) assigned to the BGP table for the third provider; a BGP table for the fourth provider/customer (e.g., Provider 4 Table) and the fifth table priority value (T5) assigned to the BGP table for the fourth provider; a BGP table for the fifth provider/customer (e.g., Provider 5 Table) and the third table priority value (T3) assigned to the BGP table for the fifth provider; and/or the like.

As further shown in FIG. 1D, each of the BGP tables may be associated with a queue that includes multiple logical queues (e.g., storing the plurality of routes). Based on assigning the queue priority values, the network device may store, in one or more of the BGP tables, the first queue and the expedited queue priority value (E) assigned to the first queue; the second queue and the fifteenth queue priority value (P15) assigned to the second queue; the third queue and the twelfth queue priority value (P12) assigned to the third queue; the fourth queue and the tenth queue priority value (P10) assigned to the fourth queue; the fifth queue and the eighth queue priority value (P8) assigned to the fifth queue; the seventh queue and the second queue priority value (P2) assigned to the seventh queue; and/or the like.

As further shown in FIG. 1D, and by reference number 120, the network device may create one or more BGP update messages based on a greatest queue priority value (expedited) and by traversing the BGP tables using the table priority values. For example, the network device may start at the BGP table for the second provider/customer (e.g., since the BGP table for the second provider/customer is associated with a greatest table priority value, i.e., the first table priority value (T1)), and may create one or more BGP update messages based on the first queue (e.g., since the first queue is associated with a greatest queue priority value, i.e., the expedited queue priority value (E)) of the BGP table for the second provider/customer. As shown by step 1 of reference number 120, the network device may move to the BGP table for the first provider/customer (e.g., since the BGP table for the first provider/customer is associated with a next greatest table priority value, i.e., the second table priority value (T2)), and may create one or more BGP update messages based on the first queue of the BGP table for the first provider/customer. As shown by step 2 of reference number 120, the network device may move to the BGP table for the fifth provider/customer (e.g., since the BGP table for the fifth provider/customer is associated with a next greatest table priority value, i.e., the third table priority value (T3)), and may create one or more BGP update messages based on the first queue of the BGP table for the fifth provider/customer.

As shown by step 3 of reference number 120, the network device may move to the BGP table for the third provider/customer (e.g., since the BGP table for the third provider/customer is associated with a next greatest table priority value, i.e., the fourth table priority value (T4)), and may create one or more BGP update messages based on the first queue of the BGP table for the third provider/customer. As shown by step 4 of reference number 120, the network device may move to the BGP table for the fourth provider/customer (e.g., since the BGP table for the fourth provider/customer is associated with a next greatest table priority value, i.e., the fifth table priority value (T5)), and may create one or more BGP update messages based on the first queue of the BGP table for the fourth provider/customer. As shown by step 5 of reference number 120, the network device may move to a next BGP table to create one or more BGP update messages based on the first queue of the next BGP table.

Figure 1E:
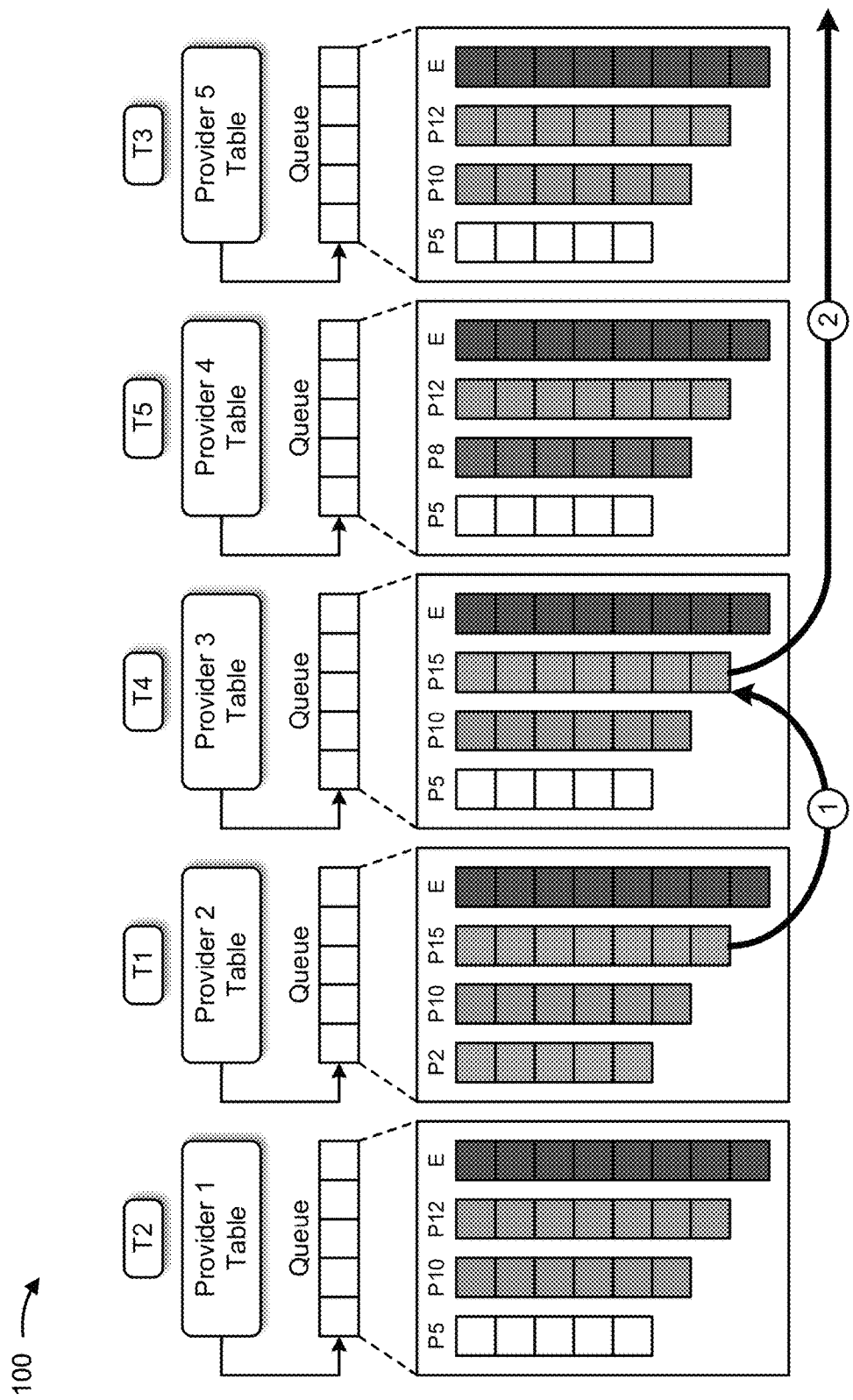

As shown in FIG. 1E, and by reference number 125, the network device may create one or more BGP update messages based on a second greatest queue priority value (P15) and by traversing the BGP tables using the table priority values. For example, the network device may start at the BGP table for the second provider/customer (e.g., since the BGP table for the second provider/customer is associated with a greatest table priority value, i.e., the first table priority value (T1)), and may create one or more BGP update messages based on the second queue (e.g., since the second queue is associated with a next greatest queue priority value, i.e., the fifteenth queue priority value (P15)) of the BGP table for the second provider/customer. As shown by step 1 of reference number 125, the network device may move to the BGP table for the third provider/customer (e.g., since the BGP table for the third provider/customer is associated with a next greatest table priority value, i.e., the fourth table priority value (T4)), and may create one or more BGP update messages based on the second queue of the BGP table for the third provider/customer. As shown by step 2 of reference number 125, the network device may move to a next BGP table to create one or more BGP update messages based on the second queue of the next BGP table.

As shown in FIG. 1F, and by reference number 130, the network device may create one or more BGP update messages based on a third greatest queue priority value (P12) and by traversing the BGP tables using the table priority values. For example, the network device may start at the BGP table for the first provider/customer (e.g., since the BGP table for the first provider/customer is associated with a greatest table priority value, i.e., the second table priority value (T2)), and may create one or more BGP update messages based on the third queue (e.g., since the third queue is associated with a next greatest queue priority value, i.e., the twelfth queue priority value (P12)) of the BGP table for the first provider/customer. As shown by step 1 of reference number 130, the network device may move to the BGP table for the fifth provider/customer (e.g., since the BGP table for the fifth provider/customer is associated with a next greatest table priority value, i.e., the third table priority value (T3)), and may create one or more BGP update messages based on the third queue of the BGP table for the fifth provider/customer. As shown by step 2 of reference number 130, the network device may move to the BGP table for the fourth provider/customer (e.g., since the BGP table for the fourth provider/customer is associated with a next greatest table priority value, i.e., the fourth table priority value (T4)), and may create one or more BGP update messages based on the third queue of the BGP table for the fourth provider/customer. As shown by step 3 of reference number 130, the network device may move to a next BGP table to create one or more BGP updates messages based on the third queue of the next BGP table.

Figure 1G:
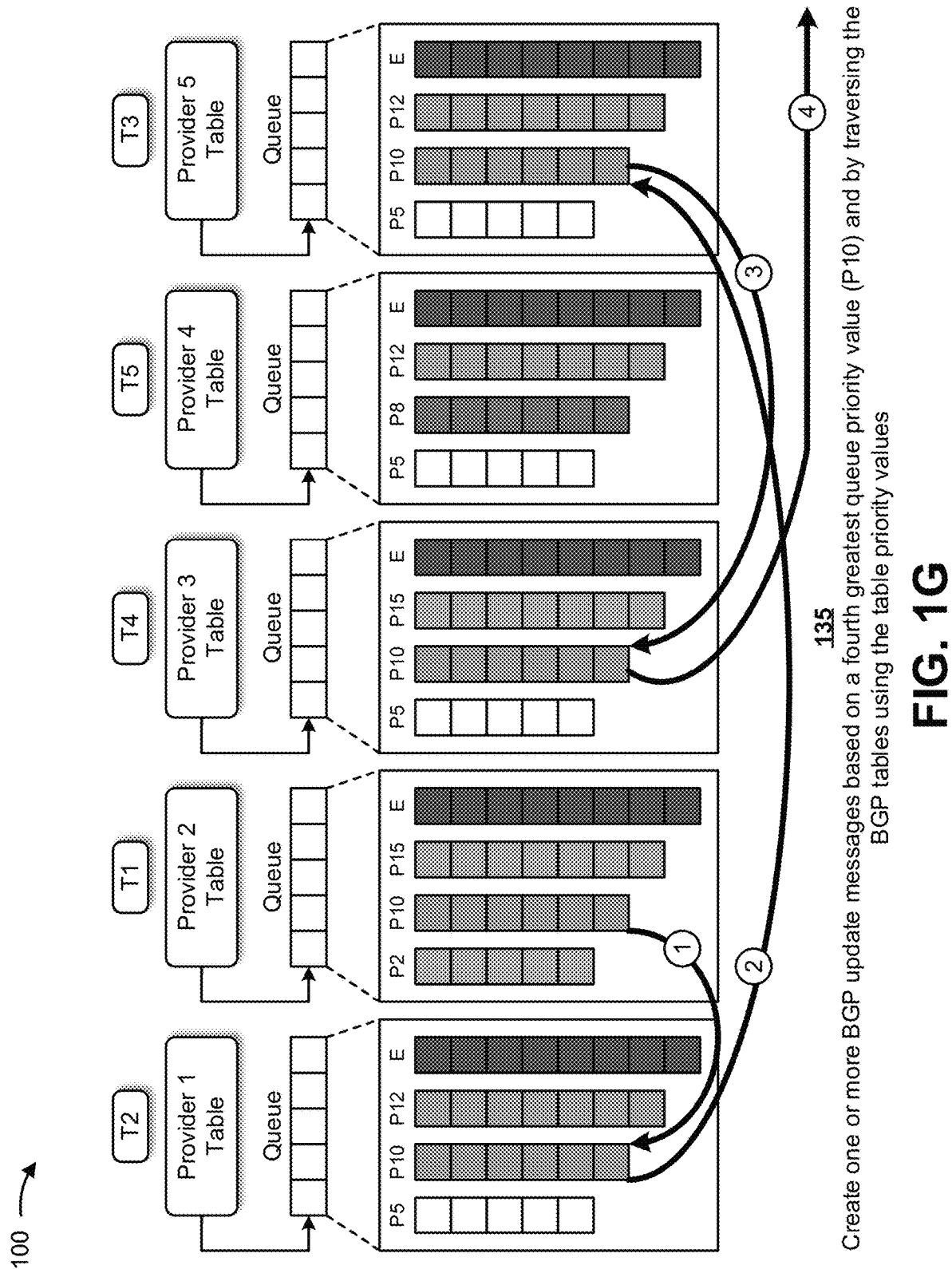

As shown in FIG. 1G, and by reference number 135, the network device may create one or more BGP update messages based on a fourth greatest queue priority value (P10) and by traversing the BGP tables using the table priority values. For example, the network device may start at the BGP table for the second provider/customer (e.g., since the BGP table for the second provider/customer is associated with a greatest table priority value, i.e., the first table priority value (T1)), and may create one or more BGP update messages based on the fourth queue (e.g., since the fourth queue is associated with a next greatest queue priority value, i.e., the tenth queue priority value (P10)) of the BGP table for the second provider/customer. As shown by step 1 of reference number 135, the network device may move to the BGP table for the first provider/customer (e.g., since the BGP table for the first provider/customer is associated with a next greatest table priority value, i.e., the second table priority value (T2)), and may create one or more BGP update messages based on the fourth queue of the BGP table for the first provider/customer.

As shown by step 2 of reference number 135, the network device may move to the BGP table for the fifth provider/customer (e.g., since the BGP table for the fifth provider/customer is associated with a next greatest table priority value, i.e., the third table priority value (T3)), and may create one or more BGP update messages based on the fourth queue of the BGP table for the fifth provider/customer. As shown by step 3 of reference number 135, the network device may move to the BGP table for the third provider/customer (e.g., since the BGP table for the third provider/customer is associated with a next greatest table priority value, i.e., the fourth table priority value (T4)), and may create one or more BGP update messages based on the third queue of the BGP table for the third provider/customer. As shown by step 4 of reference number 135, the network device may move to a next BGP table to create one or more BGP update messages based on the fourth queue of the next BGP table.

Figure 1H:
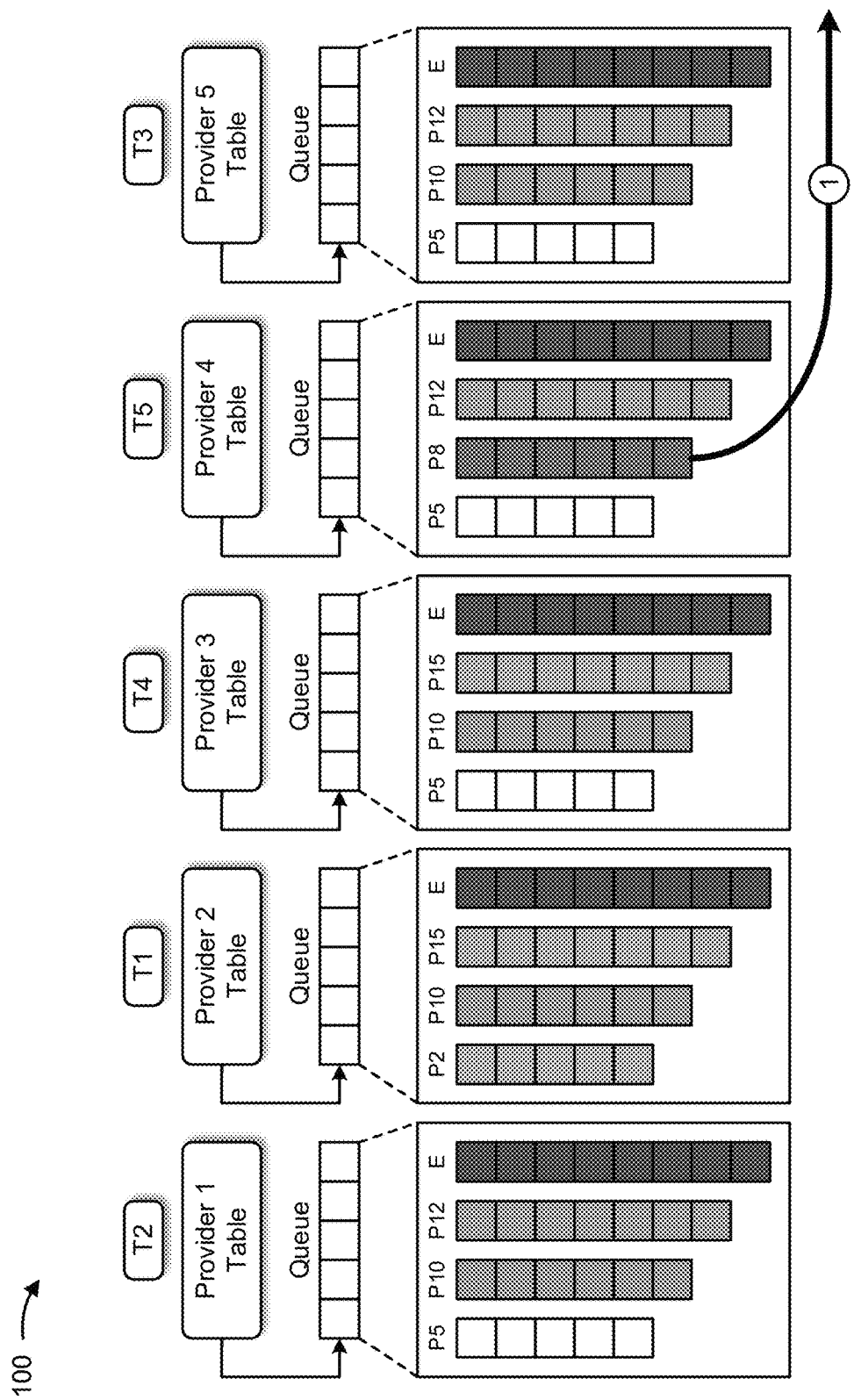

As shown in FIG. 1H, and by reference number 140, the network device may create one or more BGP update messages based on a fifth greatest queue priority value (P8) and by traversing the BGP tables using the table priority values. For example, the network device may start at the BGP table for the fourth provider/customer (e.g., since the BGP table for the fourth provider/customer is associated with a greatest table priority value, i.e., the fifth table priority value (T5)), and may create one or more BGP update messages based on the fifth queue (e.g., since the fifth queue is associated with a next greatest queue priority value, i.e., the eighth queue priority value (P8)) of the BGP table for the fourth provider/customer. As shown by step 1 of reference number 140, the network device may move to a next BGP table to create one or more BGP messages based on the fifth queue of the next BGP table.

Figure 1I:
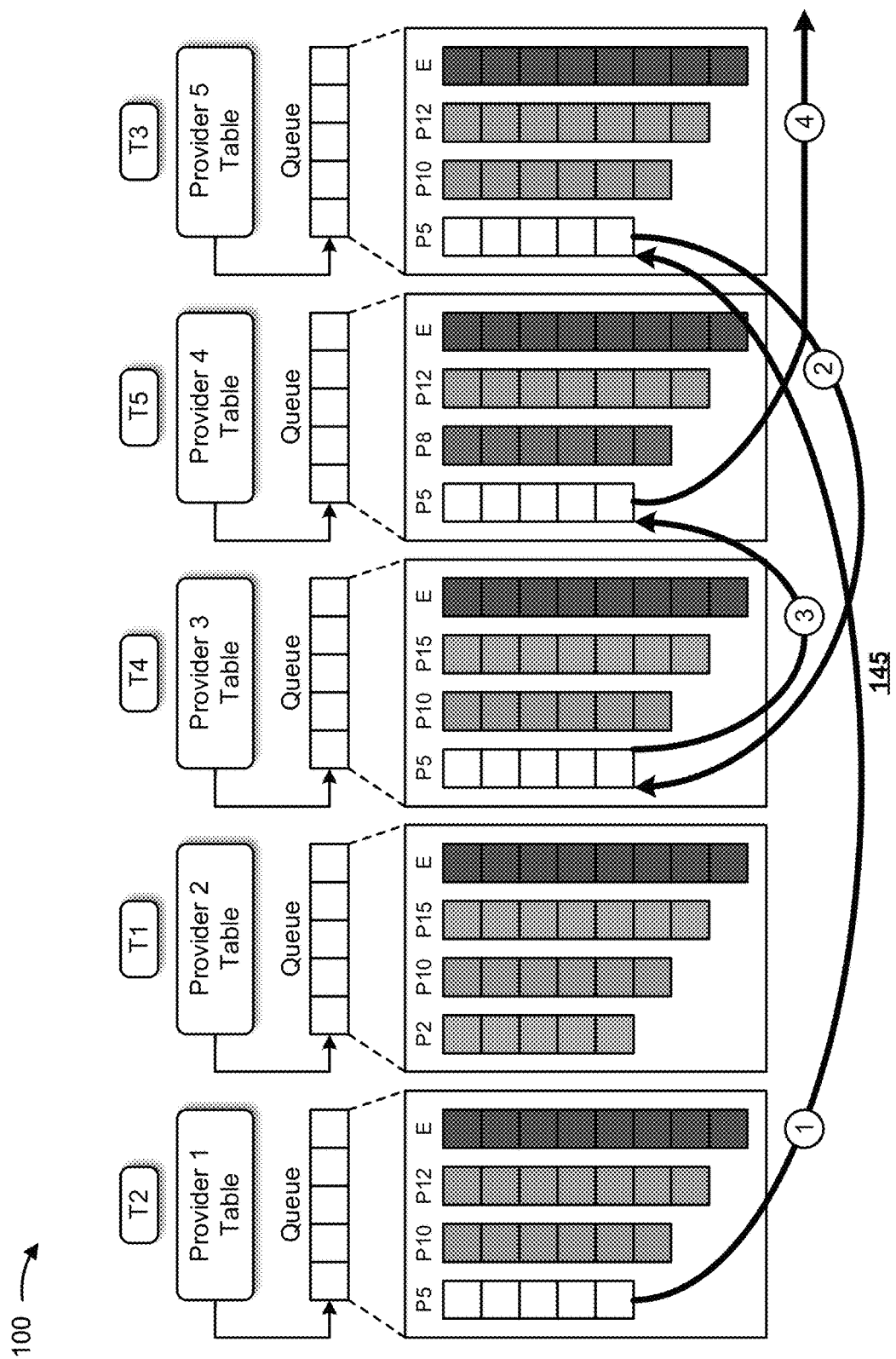

As shown in FIG. 1I, and by reference number 145, the network device may create one or more BGP update messages based on a sixth greatest queue priority value (P5) and by traversing the BGP tables using the table priority values. For example, the network device may start at the BGP table for the first provider/customer (e.g., since the BGP table for the first provider/customer is associated with a greatest table priority value, i.e., the second table priority value (T2)), and may create one or more BGP update messages based on the seventh queue (e.g., since the seventh queue is associated with a next greatest queue priority value, i.e., the fifth queue priority value (P5)) of the BGP table for the first provider/customer. As shown by step 1 of reference number 145, the network device may move to the BGP table for the fifth provider/customer (e.g., since the BGP table for the fifth provider/customer is associated with a next greatest table priority value, i.e., the third table priority value (T3)), and may create one or more BGP update messages based on the seventh queue of the BGP table for the fifth provider/customer.

As shown by step 2 of reference number 145, the network device may move to the BGP table for the third provider/customer (e.g., since the BGP table for the third provider/customer is associated with a next greatest table priority value, i.e., the fourth table priority value (T4)), and may create one or more BGP update messages based on the seventh queue of the BGP table for the third provider/customer. As shown by step 3 of reference number 145, the network device may move to the BGP table for the fourth provider/customer (e.g., since the BGP table for the fourth provider/customer is associated with a next greatest table priority value, i.e., the fifth table priority value (T5)), and may create one or more BGP update messages based on the seventh queue of the BGP table for the fourth provider/customer. As shown by step 4 of reference number 145, the network device may move to a next BGP table to create one or more BGP update messages based on the seventh queue of the next BGP table.

Figure 1J:
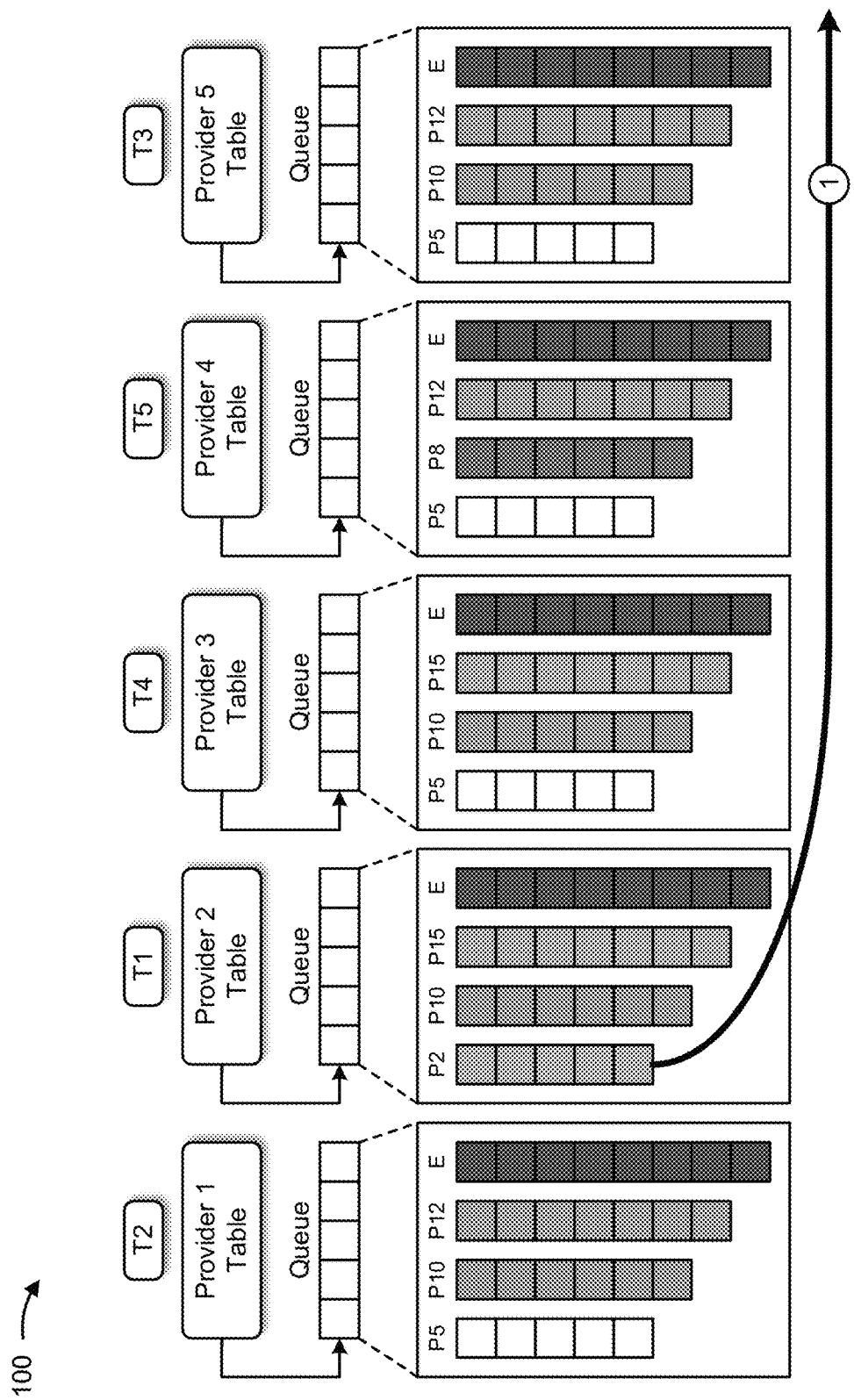

As shown in FIG. 1J, and by reference number 150, the network device may create one or more BGP update messages based on a seventh greatest queue priority value (P2) and by traversing the BGP tables using the table priority values. For example, the network device may start at the BGP table for the second provider/customer (e.g., since the BGP table for the second provider/customer is associated with a greatest table priority value, i.e., the first table priority value (T1)), and may create one or more BGP update messages based on the seventh queue (e.g., since the seventh queue is associated with a next greatest queue priority value, i.e., the second queue priority value (P2)) of the BGP table for the second provider/customer. As shown by step 1 of reference number 150, the network device may move to a next BGP table to create one or more BGP update messages based on the seventh queue of the next BGP table.

In some implementations, the network device may traverse through the plurality of BGP tables and the plurality of queues in the manner described above in connection with FIGS. 1D-1J, and may identify updated information in the plurality of queues based on traversing the plurality of BGP tables and the plurality of queues. In some implementations, the network device traversing each of the plurality of queues of the plurality of BGP tables in a non-sequential manner. The network device may create BGP update messages based on the updated information, and may provide the BGP update messages to one or more other network devices of the networks.

In some implementations, the network device may assign a portion of the plurality of table priority values to a portion of the plurality of BGP tables associated with a corresponding portion of the plurality of providers/customers, and may assign a remaining portion of the plurality of table priority values to a remaining portion of the plurality of BGP tables associated with a remaining portion of the plurality of providers/customers. In some implementations, the network device may identify a BGP table, of the plurality of BGP tables, with a greatest table priority value, and may identify a queue, of the plurality of queues and of the BGP table, with a greatest queue priority value. The network device may create one or more BGP update messages based on the queue prior to creating other BGP update messages based on the plurality of queues.

In some implementations, the network device may assign a first set of the plurality of table priority values to a respective plurality of BGP tables based on a network migration; may assign a second set of the plurality of table priority values (e.g., different than the first set) to the respective plurality of BGP tables based on a network reboot; may assign a third set of the plurality of table priority values (e.g., different than the first set and the second set) to the respective plurality of BGP tables based on an initial deployment of the network device; may assign a fourth set of the plurality of table priority values (e.g., different than the first, second, and third sets) to the respective plurality of BGP tables based on a network device daemon restart; may assign a fifth set of the plurality of table priority values (e.g., different than the first, second, third, and fourth sets) to the respective plurality of BGP tables based on a new provider/customer deployment; and/or the like.

In some implementations, the network device may utilize a single routing information base (RIB) order for entire BGP groups of providers, based on the following example code:

```
Step-1: Define a policy with preferred table order, first one
   is highest priority policy-options {
rib-table-order {
inet.3;
inet.0;
vrf-2.inet.0;
inetflow.0;
vrf-1.inet.0;
}
}
Step-2: Apply the policy in routing-options to make it
   valid for entire BGP groups routing-options {
rib-table-priority {
export rib-table-order;
}
}
```

In some implementations, the network device may utilize multiple RIB orders for different BGP groups of providers, based on the following example code:

```
Step-1: Define Multiple table orders
policy-options {
rib-table-order {
table-list-1 {
inet.3;
inet.0;
vrf-2.inet.0;
inetflow.0;
vrf-1.inet.0;
}
```

```
table-list-2 {
inet.0;
inet.3;
vrf-1.inet.0;
inetflow.0;
vrf-2.inet.0;
}
table-list-3 {
inetflow.0;
inet.3;
inet.0;
vrf-2.inet.0;
vrf-1.inet.0;
}
Step-2: Apply the policy in BGP for a group
protocols {
bgp {
group BRP_PRIO_1{
export table-list-3;
}
group BRP_PRIO-2 {
export table-list-1;
}
group BRP_PRIO-3 {
export table-list-2;
}
```

In some implementations, the network device may utilize two sets of priority for the BGP tables, based on the following example code:

```
First set for well-established tables
like inet.0, inet.3, inet6.0, inetflow.0
routing-options {
rib-table-priority {
inet.0 priority 1;
inet.3 priority 2;
inet6.3 priority 3;
inet6.0 priority 4;
inetflow.0 priority 5;
}
}
For User defined tables like l3vpn or l2vpn or evpn tables,
define priority at the time of definition
routing-instances {
brp_bgp_fec129_9 {
instance-type l2vpn;
table-order priority 11;
}
brp_bgp_jec129_1 {
instance-type l2vpn;
table-order priority 12;
}
brp_vrf_10{
instance-type vrf;
table-order priority 13;
}
brp_vrf_20 {
instance-type vrf;
table-order priority 17;
}
brp_vrf_90 {
instance-type vrf;
table-order priority 16;
}
brp_vrf_99 {
instance-type vrf;
table-order priority 15;
}
```

In this way, the network device may provide convergence prioritization for BGP services across providers/customers. This conserves computing resources (e.g., processing resources, memory resources, communication resources, and/or the like), networking resources, and/or the like that would otherwise be wasted in incorrectly processing queues without priority across different providers/customers, delaying traffic for providers/customers that pay more for services than other providers/customers, and/or the like.

As indicated above, FIGS. 1A-1J are provided merely as examples. Other examples may differ from what is described with regard to FIGS. 1A-1J.

Figure 2:
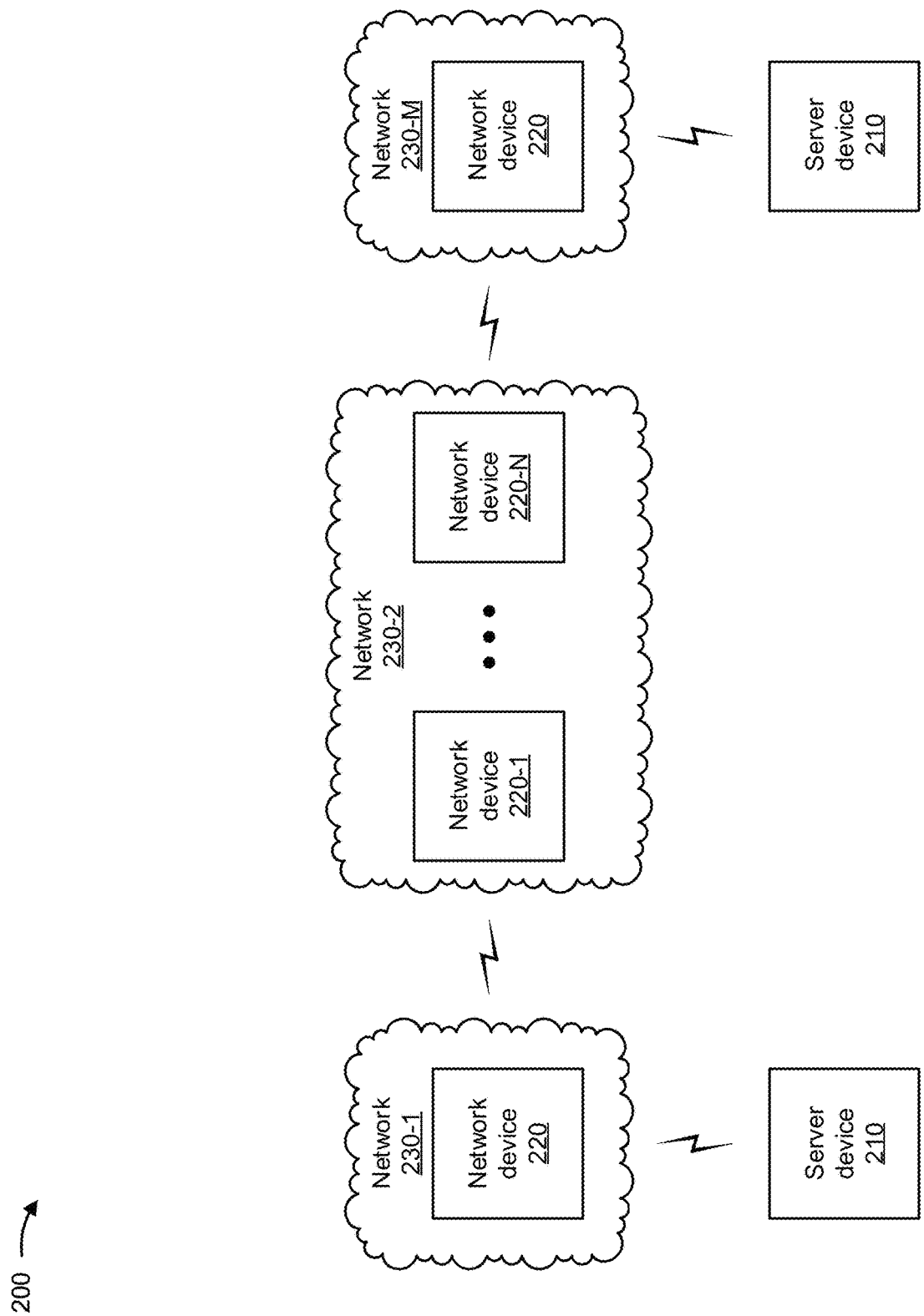
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include server devices 210, a group of network devices 220 (shown as network device 220 or network device 220-1 through network device 220-N), and networks 230 (shown as network 230-1 through network 230-M). Devices of environment 200 may interconnect via wired connections, wireless connections, or a combination of wired and wireless connections.

Server device 210 includes one or more devices capable of receiving, generating, storing, processing, and/or providing information, such as information described herein. For example, server device 210 may include a laptop computer, a tablet computer, a desktop computer, a group of server devices, or a similar type of device. In some implementations, server device 210 may receive information from and/or transmit information (e.g., BGP-based information) to other server devices 210 and/or network devices 220.

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
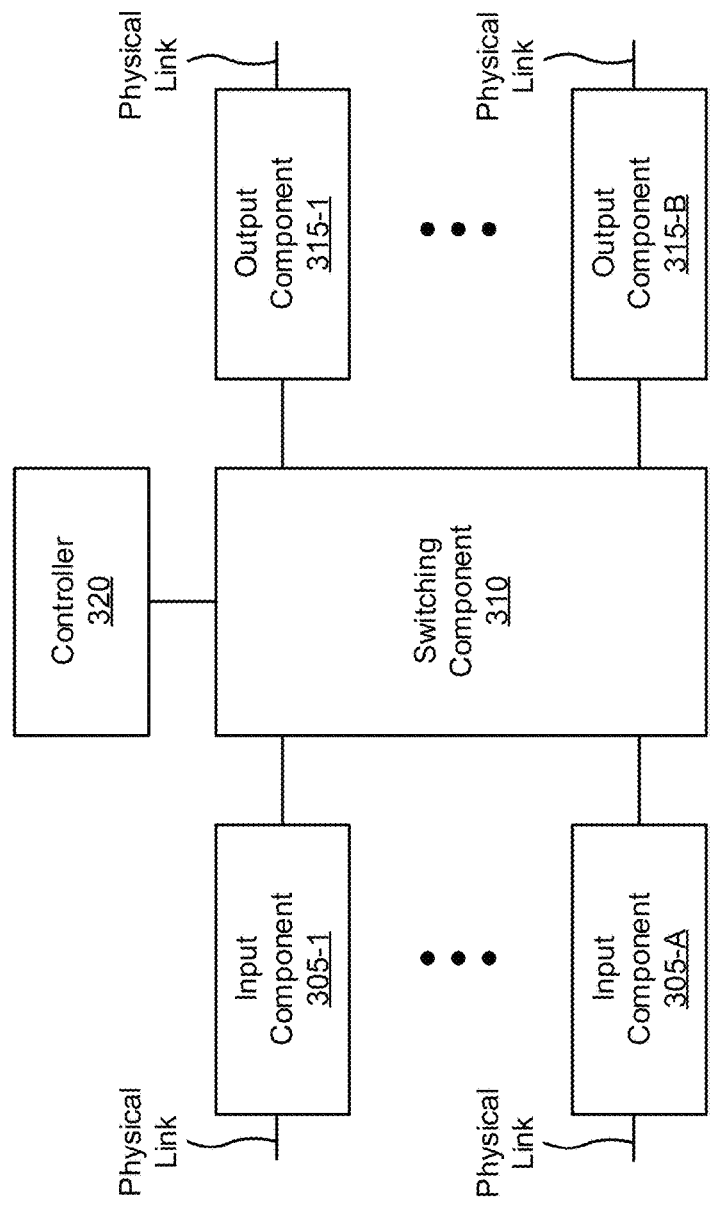
FIGS. 3 and 4 are diagrams of example components of one or more devices of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a controller 320.

Input components 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 320 may include one or more processors that can be programmed to perform a function.

In some implementations, controller 320 may include a random-access memory (RAM), a read only memory (ROM), and/or another type of dynamic or static storage device (e.g., a flash memory, a magnetic memory, an optical memory, and/or the like) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets. In some cases, controller 320 may create a session table based on information determined while initializing a link fault detection session and may forward the session table to input components 305 and/or output components 315.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
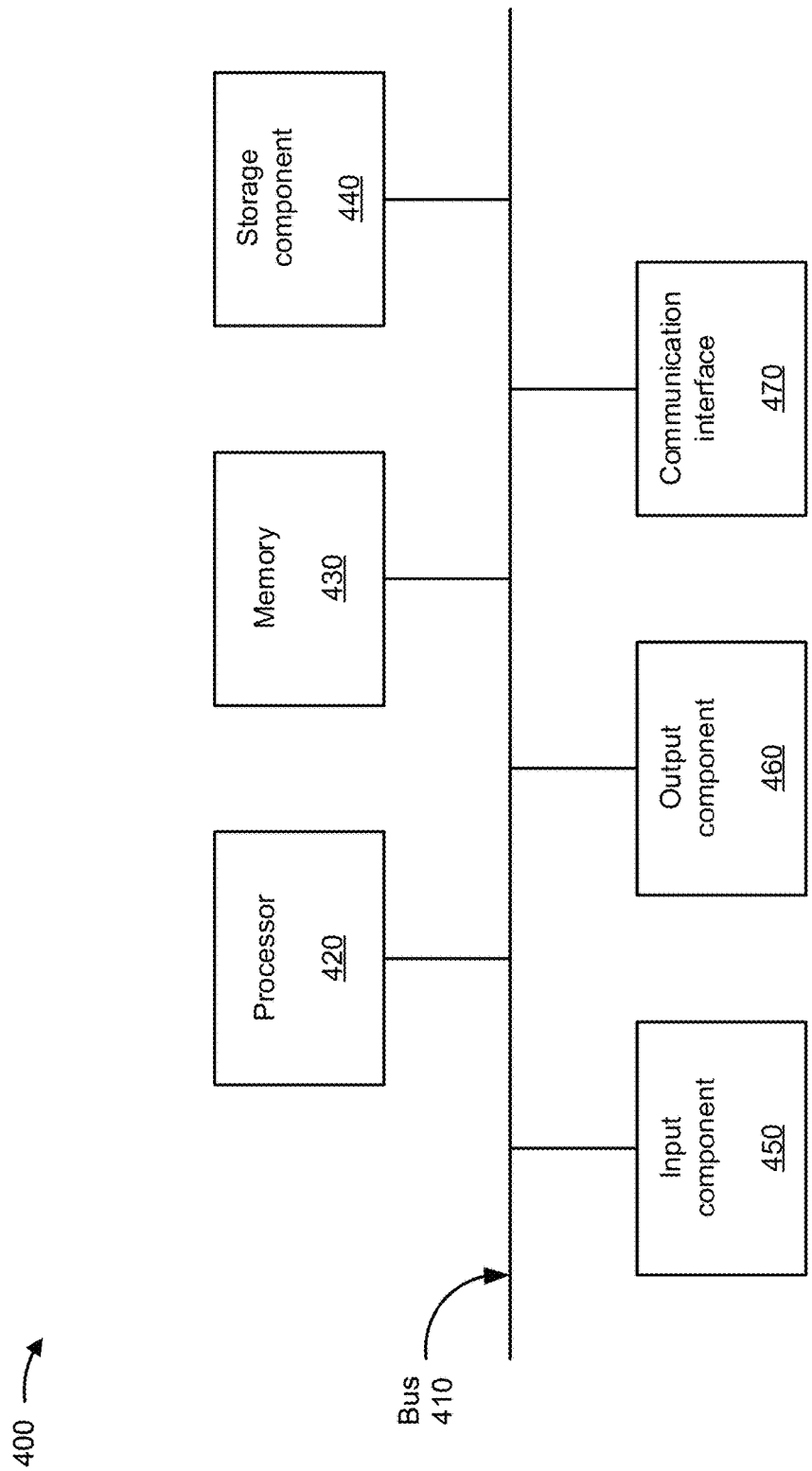

FIG. 4 is a diagram of example components of a device 400. Device 400 may correspond to server device 210 and/or network device 220. In some implementations, server device 210 and/or network device 220 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
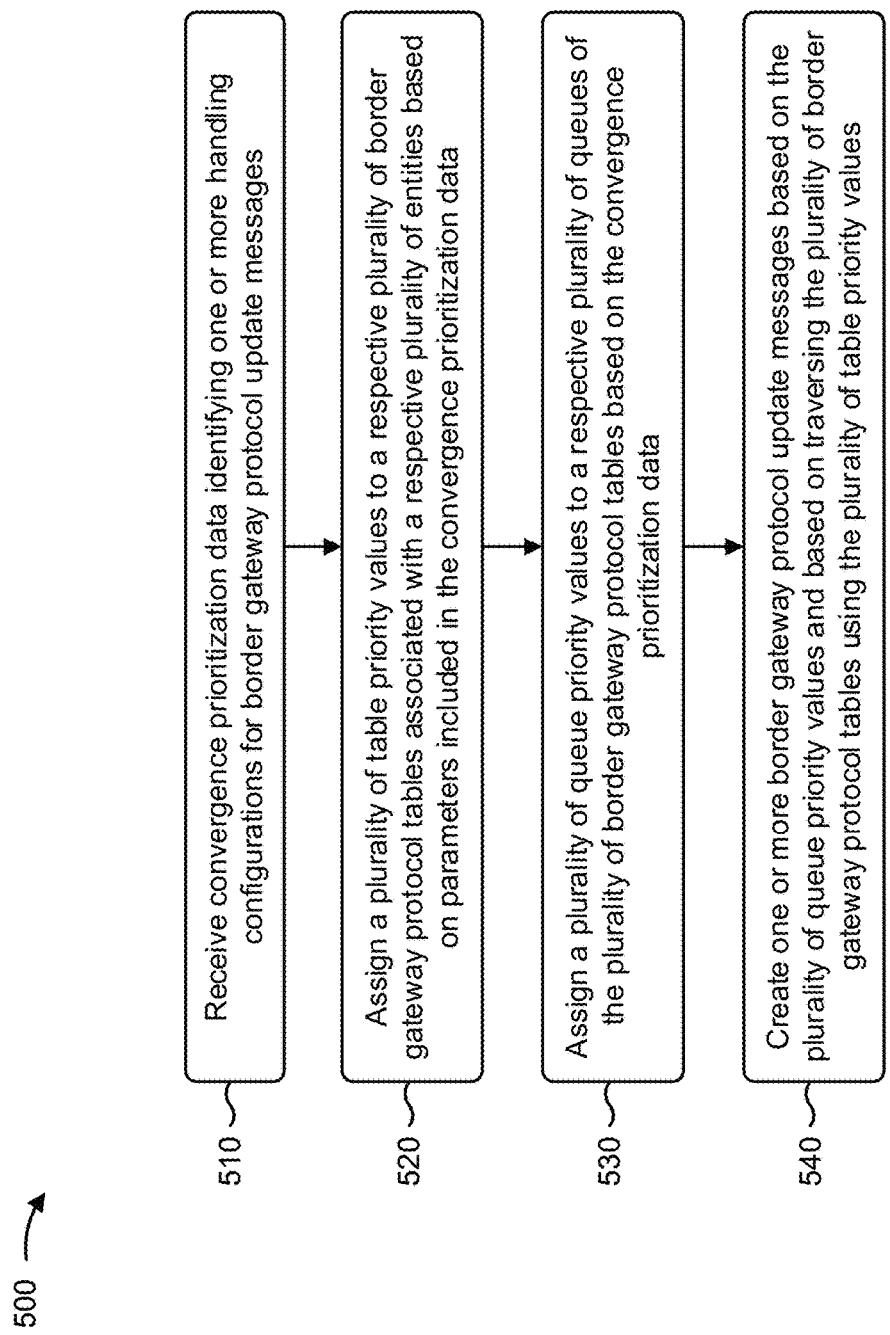

FIG. 5 is a flow chart of an example process 500 for providing convergence prioritization for border gateway protocol services across providers. In some implementations, one or more process blocks of FIG. 5 may be performed by a network device (e.g., network device 220). In some implementations, one or more process blocks of FIG. 5 may be performed by another device or a group of devices separate from or including the network device, such as a server device (e.g., server device 210).

As shown in FIG. 5, process 500 may include receiving convergence prioritization data identifying one or more handling configurations for border gateway protocol update messages (block 510). For example, the network device (e.g., using input component 305, switching component 310, controller 320, processor 420, communication interface 470, and/or the like) may receive convergence prioritization data identifying one or more handling configurations for border gateway protocol update messages, as described above.

As further shown in FIG. 5, process 500 may include assigning a plurality of table priority values to a respective plurality of border gateway protocol tables associated with a respective plurality of entities based on parameters included in the convergence prioritization data (block 520). For example, the network device (e.g., using controller 320, processor 420, memory 430, and/or the like) may assign a plurality of table priority values to a respective plurality of border gateway protocol tables associated with a respective plurality of entities based on parameters included in the convergence prioritization data, as described above.

As further shown in FIG. 5, process 500 may include assigning a plurality of queue priority values to a respective plurality of queues of the plurality of border gateway protocol tables based on the convergence prioritization data (block 530). For example, the network device (e.g., using controller 320, processor 420, storage component 440, and/or the like) may assign a plurality of queue priority values to a respective plurality of queues of the plurality of border gateway protocol tables based on the convergence prioritization data, as described above.

As further shown in FIG. 5, process 500 may include creating one or more border gateway protocol update messages based on the plurality of queue priority values and based on traversing the plurality of border gateway protocol tables using the plurality of table priority values (block 540). For example, the network device (e.g., using switching component 310, controller 320, processor 420, memory 430, storage component 440, and/or the like) may create one or more border gateway protocol update messages based on the plurality of queue priority values and based on traversing the plurality of border gateway protocol tables using the plurality of table priority values, as described above.

Process 500 may include additional implementations, such as any single implementation or any combination of implementations described below and/or in connection with one or more other processes described elsewhere herein.

In a first implementation, the parameters included in the convergence prioritization data may include an address family identifier parameter, a sub-address family identifier parameter, and a route distinguisher parameter.

In a second implementation, alone or in combination with the first implementation, process 500 may include providing the one or more border gateway protocol update messages to one or more other network devices.

In a third implementation, alone or in combination with one or more of the first and second implementations, the plurality of table priority values may enable convergence prioritization across the plurality of entities.

In a fourth implementation, alone or in combination with one or more of the first through third implementations, the plurality of table priority values may be assigned in descending order from a greatest table priority value to a smallest table priority value.

In a fifth implementation, alone or in combination with one or more of the first through fourth implementations, assigning the plurality table priority values to the respective plurality of border gateway protocol tables associated with the plurality of entities may include assigning a portion of the plurality of table priority values to a portion of the plurality of border gateway protocol tables associated with a corresponding portion of the plurality of entities, and assigning a remaining portion of the plurality of table priority values to a remaining portion of the plurality of border gateway protocol tables associated with a remaining portion of the plurality of entities.

In a sixth implementation, alone or in combination with one or more of the first through fifth implementations, creating the one or more border gateway protocol update messages may include identifying a border gateway protocol table, of the plurality of border gateway protocol tables, with a greatest table priority value; identifying a queue, of the plurality of queues and of the border gateway protocol table, with a greatest queue priority value; and creating at least one of the one or more border gateway control protocol update messages based on the identified queue.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
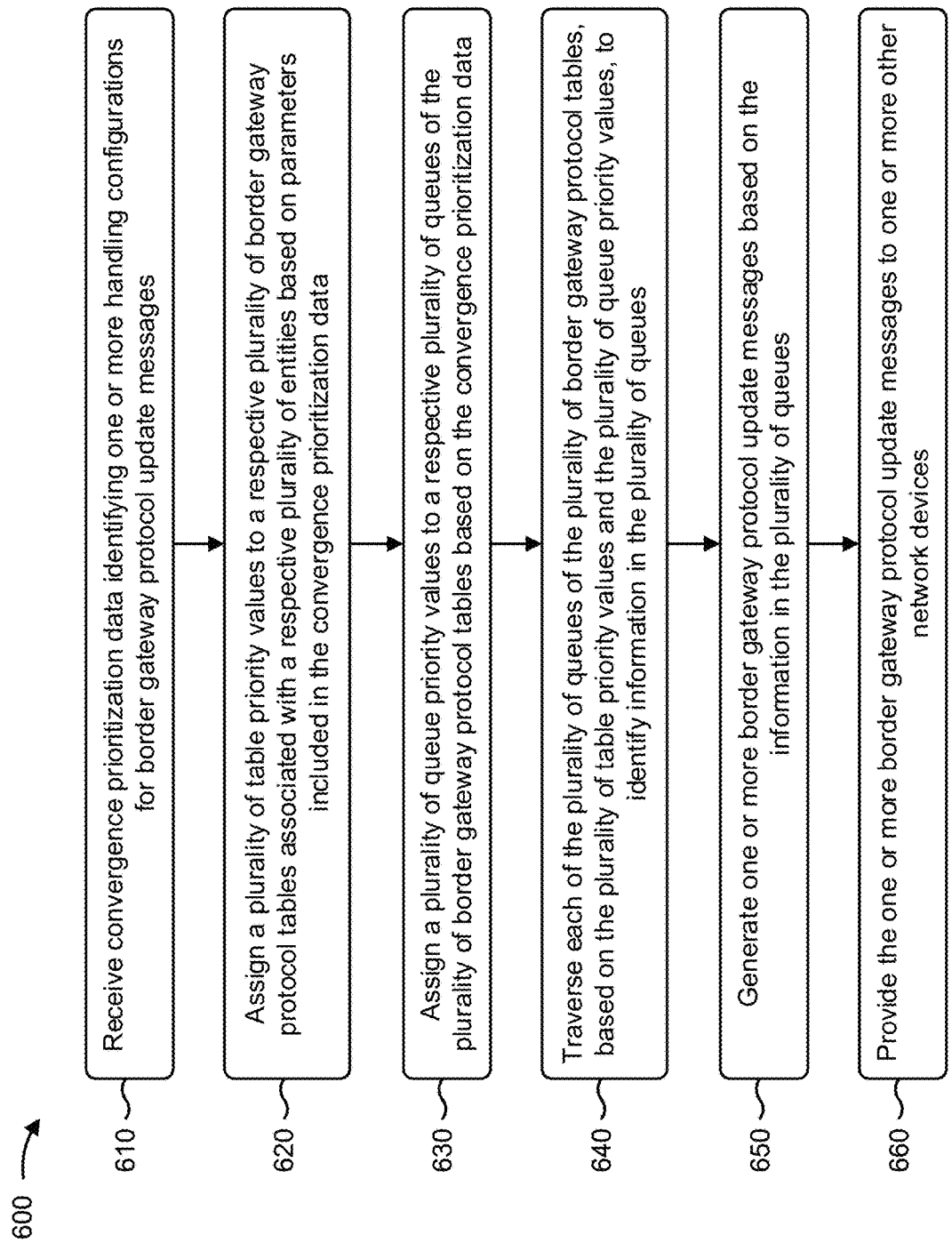

FIG. 6 is a flow chart of an example process 600 for providing convergence prioritization for border gateway protocol services across providers. In some implementations, one or more process blocks of FIG. 6 may be performed by a network device (e.g., network device 220). In some implementations, one or more process blocks of FIG. 6 may be performed by another device or a group of devices separate from or including the network device, such as a server device (e.g., server device 210).

As shown in FIG. 6, process 600 may include receiving convergence prioritization data identifying one or more handling configurations for border gateway protocol update messages (block 610). For example, the network device (e.g., using input component 305, switching component 310, controller 320, processor 420, communication interface 470, and/or the like) may receive convergence prioritization data identifying one or more handling configurations for border gateway protocol update messages, as described above.

As further shown in FIG. 6, process 600 may include assigning a plurality of table priority values to a respective plurality of border gateway protocol tables associated with a respective plurality of entities based on parameters included in the convergence prioritization data (block 620). For example, the network device (e.g., using controller 320, processor 420, memory 430, and/or the like) may assign a plurality of table priority values to a respective plurality of border gateway protocol tables associated with a respective plurality of entities based on parameters included in the convergence prioritization data, as described above.

As further shown in FIG. 6, process 600 may include assigning a plurality of queue priority values to a respective plurality of queues of the plurality of border gateway protocol tables based on the convergence prioritization data (block 630). For example, the network device (e.g., controller 320, processor 420, storage component 440, and/or the like) may assign a plurality of queue priority values to a respective plurality of queues of the plurality of border gateway protocol tables based on the convergence prioritization data, as described above.

As further shown in FIG. 6, process 600 may include generating one or more border gateway protocol update messages based on the information in the plurality of queues (block 640). For example, the network device (e.g., using controller 320, processor 420, memory 430, storage component 440, and/or the like) may generate one or more border gateway protocol update messages based on the information in the plurality of queues, as described above.

As further shown in FIG. 6, process 600 may include providing the one or more border gateway protocol update messages to one or more other network devices (block 650). For example, the network device (e.g., using switching component 310, output component 315, controller 320, processor 420, memory 430, storage component 440, communication interface 470, and/or the like) may provide the one or more border gateway protocol update messages to one or more other network devices, as described above.

Process 600 may include additional implementations, such as any single implementation or any combination of implementations described below and/or in connection with one or more other processes described elsewhere herein.

In a first implementation, each of the plurality of border gateway protocol tables may include information associated with routing traffic from the network device.

In a second implementation, alone or in combination with the first implementation, the one or more processors, assigning the plurality of table priority values to the respective plurality of border gateway protocol tables may include assigning a first set of the plurality of table priority values to the respective plurality of border gateway protocol tables based on a network migration; assigning a second set of the plurality of table priority values to the respective plurality of border gateway protocol tables based on a network reboot; assigning a third set of the plurality of table priority values to the respective plurality of border gateway protocol tables based on an initial deployment of the network device; assigning a fourth set of the plurality of table priority values to the respective plurality of border gateway protocol tables based on a network device daemon restart; or assigning a fifth set of the plurality of table priority values to the respective plurality of border gateway protocol tables based on a new provider deployment.

In a third implementation, alone or in combination with one or more of the first and second implementations, process 600 may include traversing each of the plurality of queues of the plurality of border gateway protocol tables in a non-sequential manner.

In a fourth implementation, alone or in combination with one or more of the first through third implementations, each of the plurality of border gateway protocol tables may include a portion of the plurality of queues, and the portion of the plurality of queues may include information identifying routes.

In a fifth implementation, alone or in combination with one or more of the first through fourth implementations, process 600 may include assigning the plurality of table priority values to the respective plurality of border gateway protocol tables associated with the respective plurality of entities based on one of the parameters included in the convergence prioritization data.

In a sixth implementation, alone or in combination with one or more of the first through fifth implementations, the one of the parameters may include an address family identifier parameter, a sub-address family identifier parameter, or a route distinguisher parameter.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 for providing convergence prioritization for border gateway protocol services across providers. In some implementations, one or more process blocks of FIG. 7 may be performed by a network device (e.g., network device 220). In some implementations, one or more process blocks of FIG. 7 may be performed by another device or a group of devices separate from or including the network device, such as a server device (e.g., server device 210).

As shown in FIG. 7, process 700 may include receiving convergence prioritization data identifying one or more handling configurations for border gateway protocol update messages (block 710). For example, the network device (e.g., using input component 305, switching component 310, controller 320, processor 420, communication interface 470, and/or the like) may receive convergence prioritization data identifying one or more handling configurations for border gateway protocol update messages, as described above.

As further shown in FIG. 7, process 700 may include assigning a plurality of table priority values to a respective plurality of border gateway protocol tables associated with a respective plurality of entities based on parameters included in the convergence prioritization data (block 720). For example, the network device (e.g., using controller 320, processor 420, memory 430, and/or the like) may assign a plurality of table priority values to a respective plurality of border gateway protocol tables associated with a respective plurality of entities based on parameters included in the convergence prioritization data, as described above.

As further shown in FIG. 7, process 700 may include assigning a plurality of queue priority values to a respective plurality of queues of the plurality of border gateway protocol tables based on the convergence prioritization data (block 730). For example, the network device (e.g., using controller 320, processor 420, storage component 440, and/or the like) may assign a plurality of queue priority values to a respective plurality of queues of the plurality of border gateway protocol tables based on the convergence prioritization data, as described above.

As further shown in FIG. 7, process 700 may include creating one or more border gateway protocol update messages based on the plurality of queue priority values and based on traversing the plurality of border gateway protocol tables using the plurality of table priority values (block 740). For example, the network device (e.g., using controller 320, processor 420, memory 430, storage component 440, and/or the like) may create one or more border gateway protocol update messages based on the plurality of queue priority values and based on traversing the plurality of border gateway protocol tables using the plurality of table priority values, as described above.

As further shown in FIG. 7, process 700 may include providing the one or more border gateway protocol update messages to one or more other network devices (block 750). For example, the network device (e.g., using switching component 310, output component 315, controller 320, processor 420, memory 430, storage component 440, communication interface 470, and/or the like) may provide the one or more border gateway protocol update messages to one or more other network devices, as described above.

Process 700 may include additional implementations, such as any single implementation or any combination of implementations described below and/or in connection with one or more other processes described elsewhere herein.

In a first implementation, the parameters included in the convergence prioritization data may include an address family identifier parameter, a sub-address family identifier parameter, and a route distinguisher parameter.

In a second implementation, alone or in combination with the first implementation, the plurality of table priority values may enable convergence prioritization across the plurality of entities.

In a third implementation, alone or in combination with one or more of the first and second implementations, process 700 may include assigning a portion of the plurality of table priority values to a portion of the plurality of border gateway protocol tables associated with a portion of the plurality of entities; and assigning a remaining portion of the plurality of table priority values to a remaining portion of the plurality of border gateway protocol tables associated with a remaining portion of the plurality of entities.

In a fourth implementation, assigning the plurality of table priority values to the respective plurality of border gateway protocol tables may include assigning a first set of the plurality of table priority values to the respective plurality of border gateway protocol tables based on a network migration; assigning a second set of the plurality of table priority values to the respective plurality of border gateway protocol tables based on a network reboot; assigning a third set of the plurality of table priority values to the respective plurality of border gateway protocol tables based on an initial deployment of the network device; assigning a fourth set of the plurality of table priority values to the respective plurality of border gateway protocol tables based on a network device daemon restart; or assigning a fifth set of the plurality of table priority values to the respective plurality of border gateway protocol tables based on a new provider deployment.

In a fifth implementation, alone or in combination with one or more of the first through fourth implementations, process 700 may include identifying a border gateway protocol table, of the plurality of border gateway protocol tables, with a greatest table priority value; identifying a queue, of the plurality of queues and of the border gateway protocol table, with a greatest queue priority value; and creating at least one of the one or more border gateway control protocol update messages based on the identified queue.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device, convergence prioritization data identifying one or more handling configurations for border gateway protocol update messages;
   assigning, by the network device, a plurality of table priority values to a respective plurality of border gateway protocol tables associated with a respective plurality of entities based on parameters included in the convergence prioritization data;
   assigning, by the network device, a plurality of queue priority values to a respective plurality of queues of the plurality of border gateway protocol tables based on the convergence prioritization data; and
   creating, by the network device, one or more border gateway protocol update messages based on the plurality of queue priority values and based on traversing the plurality of border gateway protocol tables using the plurality of table priority values.

2. The method of claim 1, wherein the parameters included in the convergence prioritization data include:
   an address family identifier parameter,
   a sub-address family identifier parameter, and
   a route distinguisher parameter.

3. The method of claim 1, further comprising:
   providing the one or more border gateway protocol update messages to one or more other network devices.

4. The method of claim 1, wherein the plurality of table priority values enable convergence prioritization across the plurality of entities.

5. The method of claim 1, wherein the plurality of table priority values are assigned in descending order from a greatest table priority value to a smallest table priority value.

6. The method of claim 1, wherein assigning the plurality table priority values to the respective plurality of border gateway protocol tables associated with the plurality of entities comprises:
   assigning a portion of the plurality of table priority values to a portion of the plurality of border gateway protocol tables associated with a corresponding portion of the plurality of entities; and
   assigning a remaining portion of the plurality of table priority values to a remaining portion of the plurality of border gateway protocol tables associated with a remaining portion of the plurality of entities.

7. The method of claim 1, wherein creating the one or more border gateway protocol update messages comprises:
   identifying a border gateway protocol table, of the plurality of border gateway protocol tables, with a greatest table priority value;
   identifying a queue, of the plurality of queues and of the border gateway protocol table, with a greatest queue priority value; and
   creating at least one of the one or more border gateway control protocol update messages based on the identified queue.

8. A network device, comprising:
   one or more memories; and
   one or more processors to:
   receive convergence prioritization data identifying one or more handling configurations for border gateway protocol update messages;
   assign a plurality of table priority values to a respective plurality of border gateway protocol tables associated with a respective plurality of entities based on parameters included in the convergence prioritization data;
   assign a plurality of queue priority values to a respective plurality of queues of the plurality of border gateway protocol tables based on the convergence prioritization data;
   traverse each of the plurality of queues of the plurality of border gateway protocol tables, based on the plurality of table priority values and the plurality of queue priority values, to identify information in the plurality of queues;
   generate one or more border gateway protocol update messages based on the information in the plurality of queues; and
   provide the one or more border gateway protocol update messages to one or more other network devices.

9. The network device of claim 8, wherein each of the plurality of border gateway protocol tables includes information associated with routing traffic from the network device.

10. The network device of claim 8, wherein the one or more processors, when assigning the plurality of table priority values to the respective plurality of border gateway protocol tables, are to one or more of:

assign a first set of the plurality of table priority values to the respective plurality of border gateway protocol tables based on a network migration;
assign a second set of the plurality of table priority values to the respective plurality of border gateway protocol tables based on a network reboot;
assign a third set of the plurality of table priority values to the respective plurality of border gateway protocol tables based on an initial deployment of the network device;
assign a fourth set of the plurality of table priority values to the respective plurality of border gateway protocol tables based on a network device daemon restart; or
assign a fifth set of the plurality of table priority values to the respective plurality of border gateway protocol tables based on a new provider deployment.

11. The network device of claim 8, wherein the one or more processors, when traversing each of the plurality of queues of the plurality of border gateway protocol tables, are to:
traverse each of the plurality of queues of the plurality of border gateway protocol tables in a non-sequential manner.

12. The network device of claim 8, wherein:
each of the plurality of border gateway protocol tables includes a portion of the plurality of queues, and
the portion of the plurality of queues includes information identifying routes.

13. The network device of claim 8, wherein the one or more processors, when assigning the plurality of table priority values to the respective plurality of border gateway protocol tables associated with the respective plurality of entities, are to:
assign the plurality of table priority values to the respective plurality of border gateway protocol tables associated with the respective plurality of entities based on one of the parameters included in the convergence prioritization data.

14. The network device of claim 13, wherein the one of the parameters includes:
an address family identifier parameter,
a sub-address family identifier parameter, or
a route distinguisher parameter.

15. A non-transitory computer-readable medium storing instructions, the instructions comprising:
one or more instructions that, when executed by one or more processors, cause the one or more processors to:
receive convergence prioritization data identifying one or more handling configurations for border gateway protocol update messages;
assign a plurality of table priority values to a respective plurality of border gateway protocol tables associated with a respective plurality of entities based on parameters included in the convergence prioritization data;
assign a plurality of queue priority values to a respective plurality of queues of the plurality of border gateway protocol tables based on the convergence prioritization data;
create one or more border gateway protocol update messages based on the plurality of queue priority values and based on traversing the plurality of border gateway protocol tables using the plurality of table priority values; and
provide the one or more border gateway protocol update messages to one or more other network devices.

16. The non-transitory computer-readable medium of claim 15, wherein the parameters included in the convergence prioritization data include:
an address family identifier parameter,
a sub-address family identifier parameter, and
a route distinguisher parameter.

17. The non-transitory computer-readable medium of claim 15, wherein the plurality of table priority values enable convergence prioritization across the plurality of entities.

18. The non-transitory computer-readable medium of claim 15, wherein the one or more instructions, that cause the one or more processors to assign the plurality of table priority values to the respective plurality of border gateway protocol tables, cause the one or more processors to:
assign a portion of the plurality of table priority values to a portion of the plurality of border gateway protocol tables associated with a portion of the plurality of entities; and
assign a remaining portion of the plurality of table priority values to a remaining portion of the plurality of border gateway protocol tables associated with a remaining portion of the plurality of entities.

19. The non-transitory computer-readable medium of claim 15, wherein the one or more instructions, that cause the one or more processors to assign the plurality of table priority values to the respective plurality of border gateway protocol tables, cause the one or more processors to one or more of:
assign a first set of the plurality of table priority values to the respective plurality of border gateway protocol tables based on a network migration;
assign a second set of the plurality of table priority values to the respective plurality of border gateway protocol tables based on a network reboot;
assign a third set of the plurality of table priority values to the respective plurality of border gateway protocol tables based on an initial deployment of the network device;
assign a fourth set of the plurality of table priority values to the respective plurality of border gateway protocol tables based on a network device daemon restart; or
assign a fifth set of the plurality of table priority values to the respective plurality of border gateway protocol tables based on a new provider deployment.

20. The non-transitory computer-readable medium of claim 15, wherein the one or more instructions, that cause the one or more processors to create the one or more border gateway protocol update messages, cause the one or more processors to:
identify a border gateway protocol table, of the plurality of border gateway protocol tables, with a greatest table priority value;
identify a queue, of the plurality of queues and of the border gateway protocol table, with a greatest queue priority value; and
create at least one of the one or more border gateway control protocol update messages based on the identified queue.

* * * * *